(12) United States Patent
Yamaoka et al.

(10) Patent No.: US 7,144,323 B2
(45) Date of Patent: Dec. 5, 2006

(54) SERVER FOR NETWORK GAME, NETWORK GAME PROGRESS CONTROL METHOD AND NETWORK GAME PROGRESS CONTROL PROGRAM

(75) Inventors: Masatoshi Yamaoka, Sakai (JP); Kazuhiro Namba, Amagasaki (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 512 days.

(21) Appl. No.: 10/174,171

(22) Filed: Jun. 17, 2002

(65) Prior Publication Data

US 2002/0198053 A1    Dec. 26, 2002

(30) Foreign Application Priority Data

Jun. 22, 2001 (JP) .............................. 2001-190371

(51) Int. Cl.
A63F 13/00  (2006.01)

(52) U.S. Cl. ...................................................... 463/42

(58) Field of Classification Search ............ 463/40–42, 463/16, 25, 4, 9, 17–21; 273/246, 247, 259, 273/273, 274, 277; 700/91–92, 232–233, 700/235; 705/17, 58; 235/375, 487
See application file for complete search history.

(56) References Cited

U.S. PATENT DOCUMENTS

| | | | | |
|---|---|---|---|---|
| 5,588,649 A | * | 12/1996 | Blumberg et al. | ............. 463/18 |
| 5,749,785 A | * | 5/1998 | Rossides | ....................... 463/25 |
| 6,015,345 A | * | 1/2000 | Kail | .............................. 463/16 |
| 6,135,881 A | | 10/2000 | Abbott et al. | |
| 6,200,216 B1 | * | 3/2001 | Peppel | ........................... 463/1 |
| 6,236,900 B1 | * | 5/2001 | Geiger | ......................... 700/91 |
| 6,385,596 B1 | * | 5/2002 | Wiser et al. | .................. 705/51 |
| 6,454,647 B1 | * | 9/2002 | Woodbury, Jr. | .............. 463/16 |
| 2002/0115489 A1 | * | 8/2002 | Jordan et al. | ................. 463/42 |
| 2002/0155892 A1 | * | 10/2002 | Mishina et al. | .............. 463/42 |
| 2003/0008710 A1 | | 1/2003 | Yamaoka et al. | |

FOREIGN PATENT DOCUMENTS

| | | |
|---|---|---|
| EP | 0 873 772 | 10/1998 |
| EP | 0 934 765 | 8/1999 |
| JP | 6-295390 | 10/1994 |
| JP | 10-145423 | 5/1998 |
| JP | 2000-24688 | 1/2000 |
| JP | 2000-268107 | 9/2000 |
| JP | 2000-296271 | 10/2000 |
| JP | 2000-298631 | 10/2000 |

(Continued)

OTHER PUBLICATIONS

"Perfect capturing guidance for i-mode game", published by T2 publishing Co., Ltd., on Aug. 15, 2000, pp. 64-65.

*Primary Examiner*—Kim Nguyen
(74) *Attorney, Agent, or Firm*—Jordan and Hamburg LLP

(57) ABSTRACT

A network game server performs exchange of data with a terminal device employed by a user through a network. Prediction data made by a user in respect to predicted content regarding some actual phenomenon that will occur in the future is received from the terminal device. The received prediction data is registered in association with the user. The phenomenon that actually occurs in regard to the prediction data is acquired as result data and, if the result data and the prediction data satisfy a predetermined condition, prescribed points are awarded to the user who created the prediction data in question and the user is provided with value data having a prescribed value in accordance with these points.

20 Claims, 14 Drawing Sheets

FOREIGN PATENT DOCUMENTS

| | | |
|---|---|---|
| JP | 2000-325656 | 11/2000 |
| JP | 2001-43278 | 2/2001 |
| JP | 2001-56834 | 2/2001 |
| JP | 2001-155061 | 6/2001 |
| JP | 2001-157721 | 6/2001 |
| JP | 2001-297169 | 10/2001 |
| JP | 2001-353371 | 12/2001 |
| KR | 2000-0054116 | 9/2000 |

* cited by examiner

SERVER FOR NETWORK GAME, NETWORK GAME PROGRESS CONTROL METHOD AND NETWORK GAME PROGRESS CONTROL PROGRAM

BACKGROUND OF THE INVENTION

The present invention relates to a server, method, and computer program which are applicable for a network game executable by transmission and reception of data with a terminal device through a network.

In a known network game using a network such as the Internet, for example, the user performs a lottery game using a terminal device such as a mobile telephone and in the event of a correct guess a service is provided such as providing image data or value data of a celebrity to the user.

However, the above lottery game is based on the chance of a correct guess or a wrong guess and whether or not the image data is supplied is simply determined solely in accordance with such chance. The user can only acquire the image data which is the object of playing the game by a correct guess. Accordingly, the game is monotonous and lacking in continuity, even though the method of acquiring the image data makes use of a lottery game. Consequently, the image data items, which are the objects of acquisition, are only obtained one at a time as the game is governed by chance and the feeling of anticipation is not increased by improving the rate of acquisition of image data with progress of the game.

SUMMARY OF THE INVENTION

An object of the present invention is to provide a network game server, network game progress control method and network game progress control program which are free from the problems residing in the prior art.

According to an aspect of the present invention, there is provided a network game server device for performing transmission and reception of data with a terminal device employed by a user through a network. Prediction data corresponding to the content of prediction by the user regarding an actual phenomenon that may occur in the future is received and registered in association with the user. Phenomenon that actually occurred in respect of the prediction data is acquired as result data. Thereafter, a prescribed point value is awarded to the user registered in association with the prediction data if the result data and the prediction data satisfy a predetermined condition. Value data having a prescribed value in accordance with a point value is provided to the user.

Accordingly, the interest of the game is increased. The user will continuously have feeling of expectation of being able to acquire desired value data in accordance with the progress of the game.

These and other objects, features, aspects, and advantages of the present invention will become more apparent from the following detailed description of the preferred embodiments/examples with reference to the accompanying drawings.

DESCRIPTION OF THE PREFERRED EMBODIMENTS

A network game system using a network game server constituting an example of a network game server device according to an embodiment of the present invention is described with reference to appropriate drawings.

It should be noted that, although, in the description below, as an example of prediction of an actual phenomenon that will occur in the future, the description assumes that a user employing a mobile telephone or the like constituting a terminal device predicts pro baseball match results, the present invention is not particularly limited to this example and, as the example of prediction of an actual phenomenon that will occur in the future, it could be arranged for the user to predict another phenomenon, so long as the results thereof can be acquired by a network game server or network game server device. For example, it could be applied to prediction in respect to sports, fights, races, or pop charts; results or rankings are particularly suitable for prediction, but it would also be possible to apply this to prediction etc of weather data, marine data, political data and economic data etc.

Figure 1:
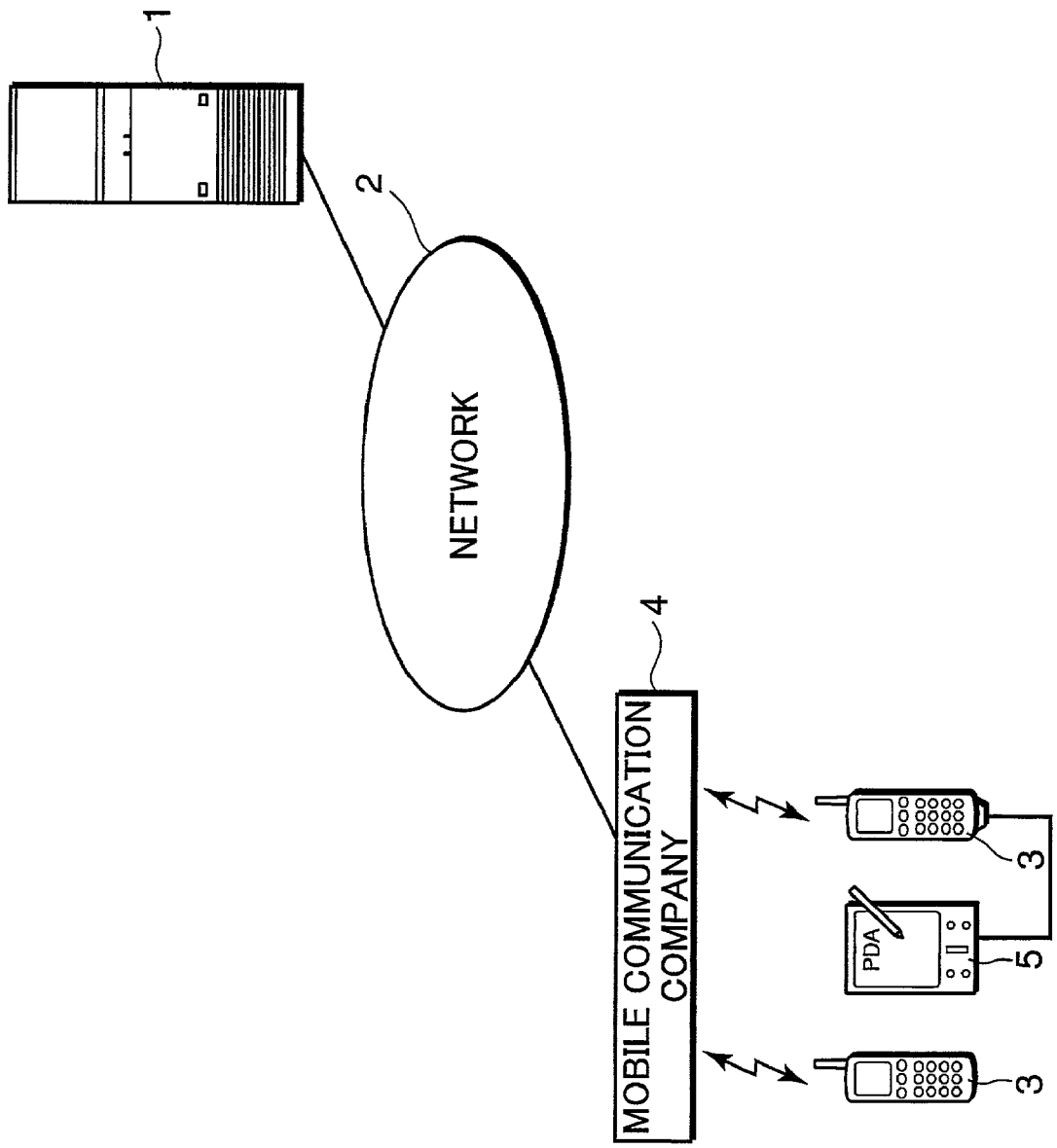
FIG. 1 is an overall diagram of a network game system employing a network game server according to an embodiment of the present invention.

Referring to FIG. 1, a network game server 1 controls the progress of the game and is installed on a network 2 constituted by the Internet. In this embodiment, a mobile telephone 3 is employed as the terminal device employed by the user; a communication of mobile telephone 3 and the network game server 1 is made possible by connection with network 2 through a prescribed mobile communication company 4 that acts as the provider for connection with the network 2.

The terminal device is not restricted to the embodiment described above and a PDA 5 or the like connected to the mobile telephone 3 could be employed; any terminal device, irrespective of type or mobile communication company where this is registered could be employed so long as it can use the same communication system.

Next, a detailed description of the network game server 1 will be given. The network game server 1 is constituted of a WWW server device or the like and manages the progress of the game by performing transmission and reception through the network 2 of data of various types with the mobile telephone 3 employed by the user.

Figure 2:
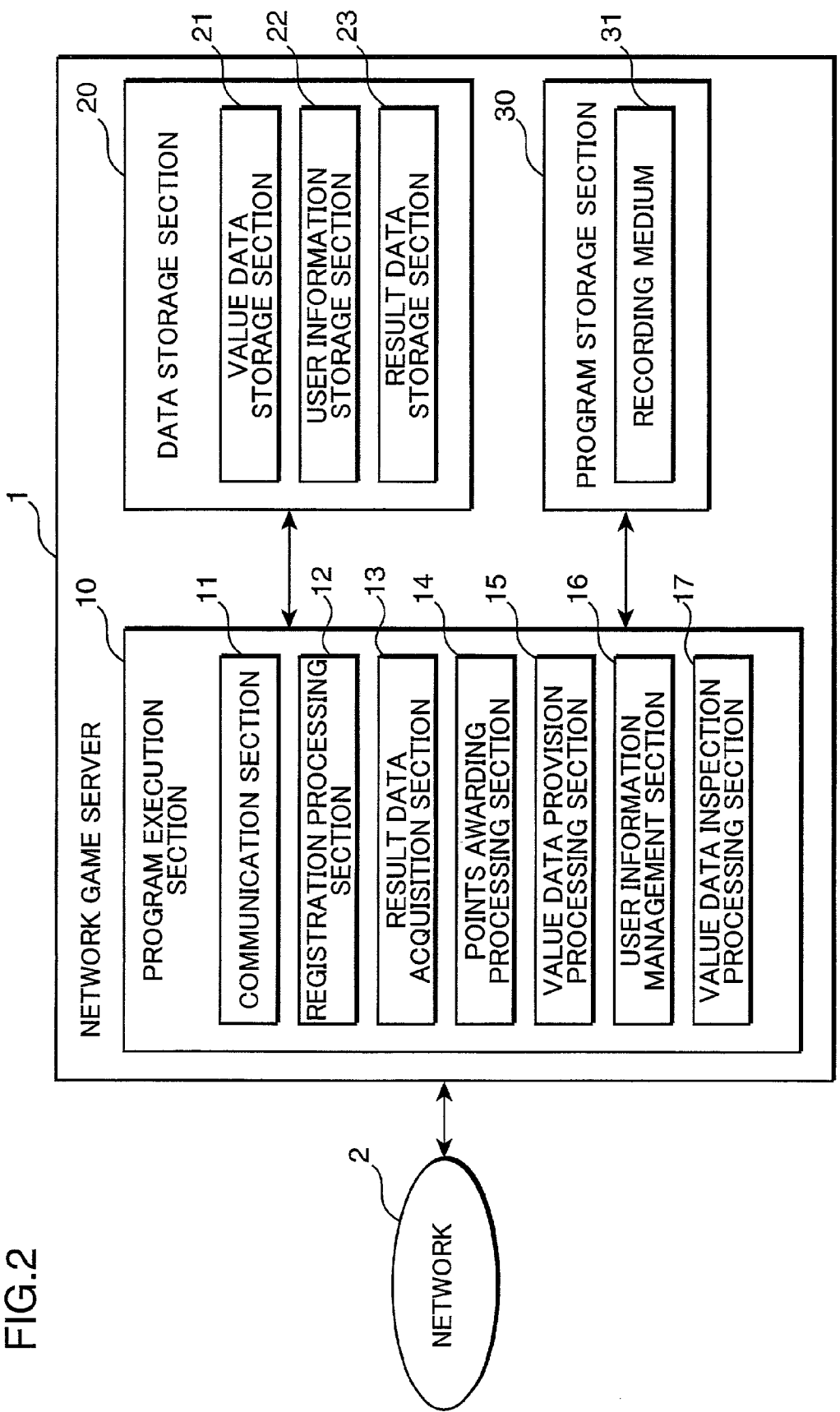
FIG. 2 is a block diagram illustrating the construction of the network game server.

FIG. 2 is a functional block diagram illustrating the construction of the network game server 1. As shown in FIG. 2, the network game server 1 functionally includes a program execution section 10, data storage section 20 and the program storage section 30. The program execution section 10 functionally includes a communication section 11, a registration processing section 12, a result data acquisition section 13, a point awarding processing section 14, a value data provision processing section 15, an user information management section 16 and a value data inspection processing section 17. The data storage section 20 includes a value data storage section 21, a user information storage section 22 and a results data storage section 23. The program storage section 30 includes a computer-readable recording medium 31.

The program execution section 10 comprises a CPU (central processing unit) etc of the network game server 1. This CPU functions as the communication section 11, the storage processing section 12, the results data acquisition section 13, the points awarding processing section 14, the value data provision processing section 15, the user information management section 16 and the value data inspection processing section 17 by reading and executing various programs stored in the recording medium 31 included in the program storage section 30.

The communication section 11 is implemented by the CPU etc running a communication program etc. The communication section 11 performs the necessary processing for performing transmission and reception of various types of data with the mobile telephone 3. The communication section 11 comprises a function of receiving as prediction data a pro-baseball team match result predicted by a user from the mobile telephone 3 (predicted data registration means), a function of receiving a request to provide value data (card image) whose provision is requested from a the mobile telephone 3 (value data supply request reception means), a function of receiving a point exchange request made from the mobile telephone 3 that requests exchange with points determined in accordance with this value data from the value data managed by the user information management section 16, to be described (point exchange request reception means) and a function of receiving a request made from the mobile telephone 3 to inspect the value data supplied to the user.

Also, the communication section 11 has a function (notification means), under the control of the user information management section 16, to be described, if it concludes that the user employing the mobile telephone 3 has acquired points, i.e., accumulated a point total, of at least a prescribed value, of notifying the mobile telephone 3 that exchange of these points for value data is possible.

Furthermore, the communication section 11 functions as part of the value data inspection allowing means, since it is provided with a function of providing in viewable form value data corresponding to a value data inspection request from the mobile telephone 3.

The registration processing section 12 is implemented by CPU etc executing a registration processing program etc. It registers (including altered/updated registration) in a user information storage section 22, to be described, information relating to the user who employs the mobile telephone 3. The registration processing section 12 has a function (predicted data registration means) of registering in association with the user who employs the mobile telephone 3 prediction data of winning or losing by pro-baseball teams received by the communication section 11 from the mobile telephone 3. As will be described in detail later, the user information includes a nickname, supported team, rival team, mail address and password.

The results data acquisition section 13 is implemented by CPU etc executing a results data acquisition program etc. The results data acquisition section 13 has a function (results data acquisition means) of acquiring as results data through the network 2 the results that are actually generated in respect to the prediction data corresponding to the content of the user's predictions.

The points awarding processing section 14 is implemented by CPU etc executing a points awarding program etc. The points awarding processing section 14 is provided with a function of comparing results data acquired by the results data acquisition section 13 and prediction data derived from the user as point awarding means and, if both these data satisfy prescribed conditions, of awarding prescribed points to the user who predicted the data to be predicted; and is also provided with a function of deleting the value data stored in the user information storage section 22, to be described, in response to a point exchange request from the mobile telephone 3 and storing points determined in accordance with this value data in the user information storage section 22.

The value data provision processing section 15 is implemented by CPU etc executing a value data provision program etc. The value data provision processing section 15 has a function of providing to the user value data having a prescribed value as value data provision means, in accordance with the points. The value data provision processing section 15 has a function of storing in user information storage section 22 in association with the user information managed by the user information management section 16 value data in accordance with a value data provision request (card image provision request) received from a the mobile telephone 3 by the communication section 11. In addition, the value data provision processing section 15 has a function of performing subtraction processing of the points determined in accordance with the value data that have been provided from the acquired points stored in the user information storage section 22, to be described, and storing the result in the user information storage section 22.

Also, the value data provision processing section 15 has a function of storing in the user information storage section 22, in association with the user, value data randomly selected from the value data stored in the value data storage section 21, if the points managed by the user information management section 16 satisfy a prescribed condition and notification of agreement to the exchange of the prescribed points for the value data has been received from the mobile telephone 3.

The user information management section 16 is implemented by the CPU etc executing a user information management program etc. The user information management section 16 manages in association with the user who employs the mobile telephone 3 the value data and the points acquired by the user within the user information storage section 22, to be described. Also, the user information management section 16 has a function of ascertaining whether or not the user who employs the mobile telephone 3 is already registered when access is received from the mobile telephone 3.

The value data inspection processing section 17 is implemented by CPU etc executing a value data inspection processing program etc. The value data inspection processing section 17, when a value data inspection request provided by the value data provision processing section 15 is received from the mobile telephone 3, performs prescribed data processing so as to ensure that this value data cannot be copied at the mobile telephone 3.

The data storage section 20 is constituted by a non-volatile memory or the like such as a hard disk of the network game server 1 and stores the necessary data for the communication section 11, the registration processing section 12, the results data acquisition section 13, the points awarding processing section 14, the value data provision processing section 15, the user information management section 16 and the value data inspection processing section 17 to perform processing to be described.

The value data storage section 21 stores the value data (card images) to be provided for inspection to the mobile telephone 3 in association with the corresponding points. The value data storage section 21 is constituted so as to be capable of storing the value data in each team and each card rank.

The user information storage section 22 stores the information relating to the user who uses the mobile telephone 3 registered by the registration processing section 12 and stores, in association, the value data and points acquired by the user by the points awarding processing section 14 and the value data provision processing section 15, during the progress steps of the game.

The results data storage section 23 stores the results data acquired by the results data acquisition section 13. The results data storage section 23 is constructed so as to be capable of accumulating and storing pro-baseball match results data corresponding to the team supported by the user and a rival team.

Next, the mobile telephone 3 (terminal device) employed by a user will be described.

Figure 3:
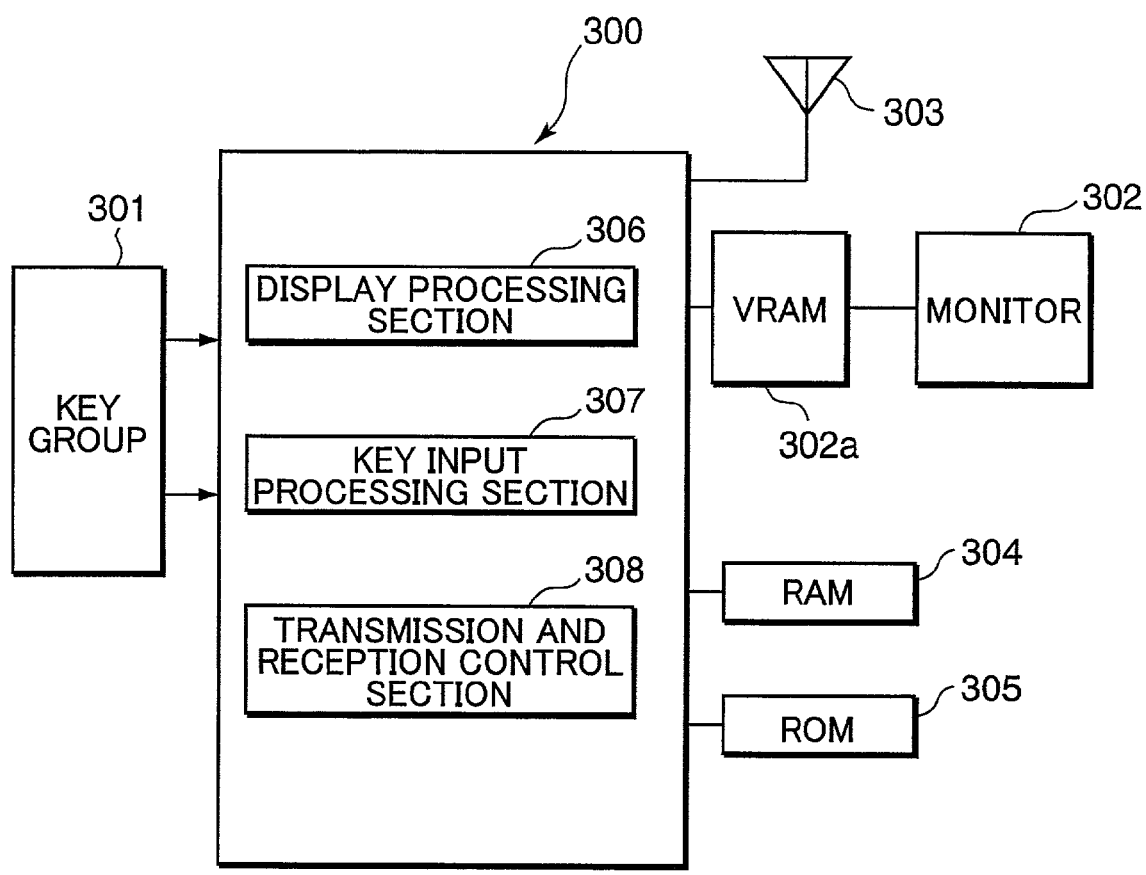
FIG. 3 is a functional block diagram illustrating the construction of a mobile telephone employed in this embodiment.

FIG. 3 is a functional block diagram illustrating the layout of the mobile telephone 3 employed in this embodiment and extracts for description in particular only those functions required in the present invention. The mobile telephone 3 comprises a control section 300 comprising a computer that controls the various sections in integrated fashion; this control section 300 is constituted by connecting a manual control member constituted by group of keys 301, VRAM 302a that stores image data to be displayed on a monitor 302, an antenna 303, a RAM 304 that temporarily holds input data and/or processing data and a ROM 305 that stores the control program etc.

The key group 301 comprises keys for telephone number input, function keys for movement of the cursor displayed on the monitor 302 and/or for determining intention and a circuit on/off key etc. It is also constituted to be capable of input of characters using the numeric keys, by setting of a function key, and is constituted to be thereby capable of input of mail data and mail addresses.

The VRAM 302a temporarily stores the image data displayed on the monitor 302 constituted by a liquid crystal display device or the like, effecting display by reading to the monitor 302 the content that is written to the VRAM 302a with a prescribed repetition period, so that this can be recognized as a static image by the residual image phenomenon.

The items from the display processing section 306 to transmission and the reception control section 308 that constitute the control section 300 will now be described. The display processing section 306 provides confirmatory display of manual input operations, display of various types of input guide screen and/or display of image data etc on the monitor and displays the content of mail. The display processing section 306 has the capacity to store at least one screen or more of image data and, for example in a condition in which only part of the image can be displayed on the monitor 302, provides for the entire image to be viewed by arranging for the image to be scrolled upwards or downwards etc in response to operation of a specified key of the key group 301. The key input processing section 307 compiles information in accordance with operation of the key group 301.

The transmission and reception control section 308 performs circuit control of incoming calls from the public switched network and outgoing calls and transmission and reception of audio data; in addition, it processes data transmission and reception of electronic mail employed through a network such as the Internet; the transmitted and received data is exchanged through the antenna 306. The image data that is transmitted and received by the mobile telephone 3 is communicated in the packet form after being compressed for example in GIF format.

Next, the processing sequence performed by the network game server 1 will be described using a flow chart.

Before describing the processing sequence performed by the network game server 1, an outline of the progress of a game according to this embodiment will be described. An outline of the progress of a game in this embodiment is that a user who wishes to participate in the game makes and registers a prediction in regard to the result of an actual pro-baseball match. Then, when the match results are issued after the actual pro-baseball match has been played, points are awarded to the user who made and registered the prediction, in accordance with the match result. The user accumulates points by repeating successful predictions and acquires card image data (value data) of pro-baseball players etc in accordance with these points. In this game, it is also possible for a user to exchange points and card image data of pro-baseball players etc that the user has acquired. Furthermore, it is possible for a user to inspect the card image data of the pro-baseball players that has thus been acquired at any time on the monitor of the portable telephone 3, in the manner of an electronic album.

First of all, the processing sequence performed by the network game server 1 from user registration processing up to processing in respect to menu selection will be described.

Figure 4:
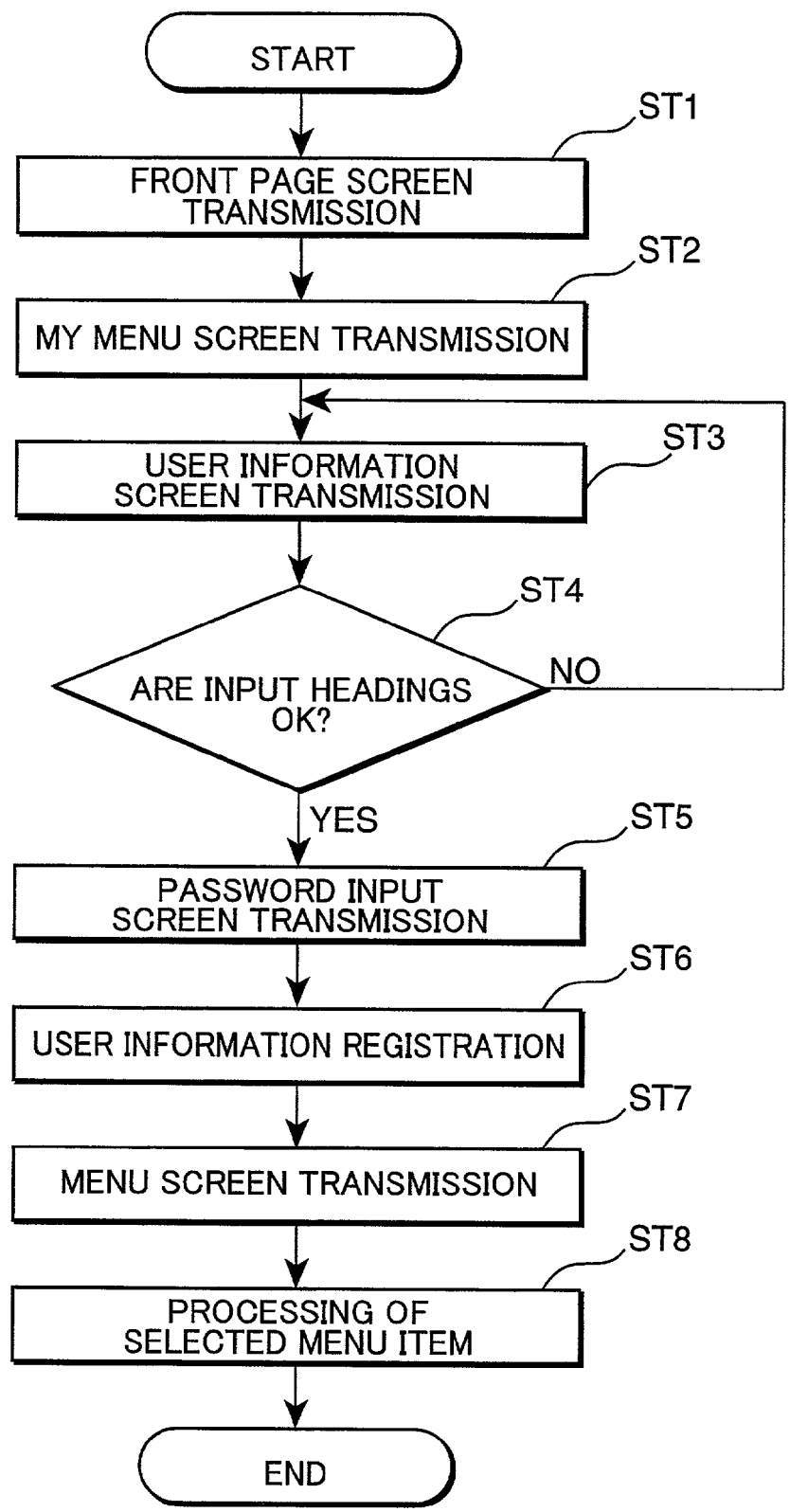
FIG. 4 is a flow chart illustrating an example of the processing procedure performed by the network game server from user registration processing up to the processing for menu item selection.
Figure 5:
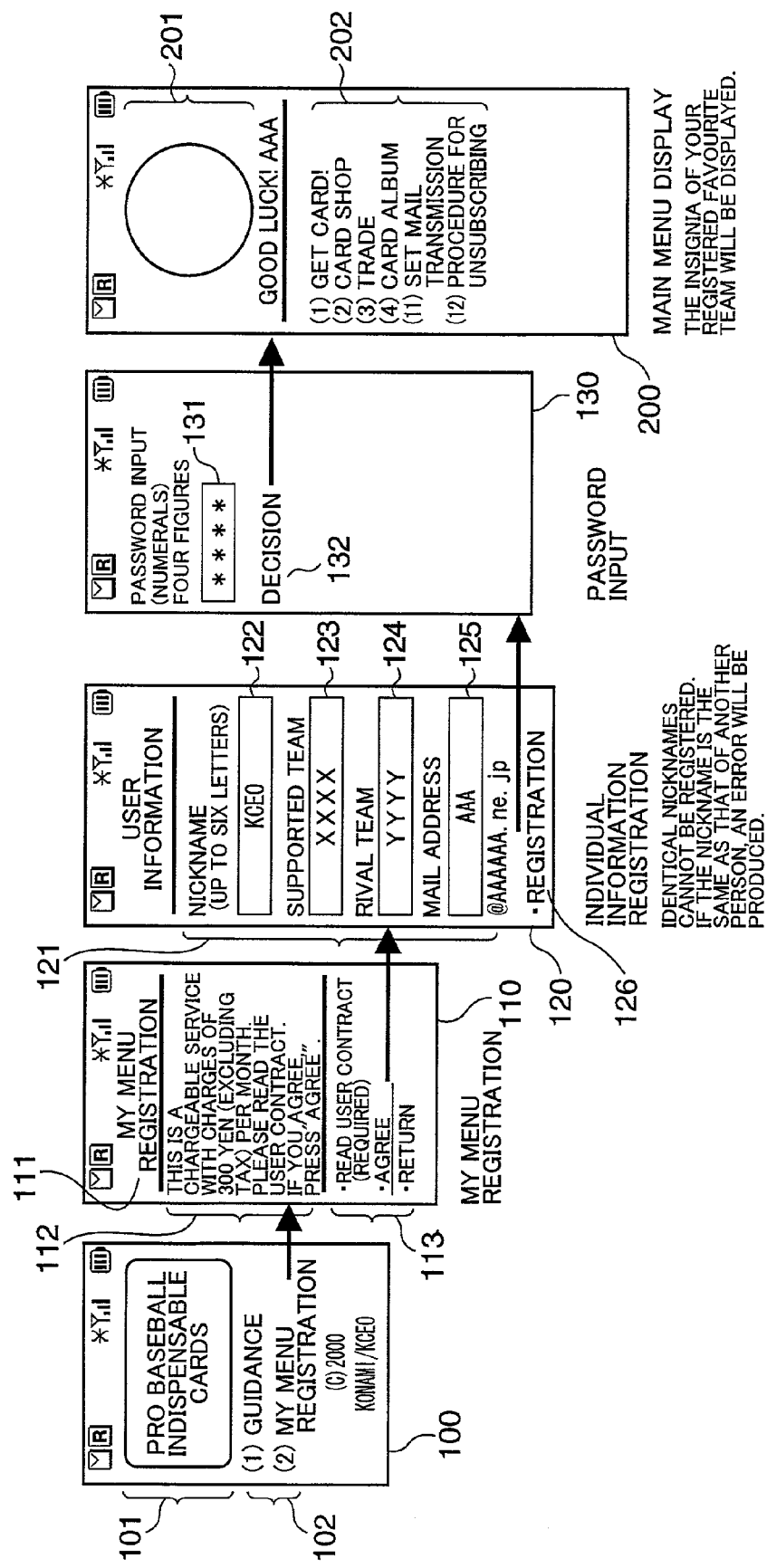
FIG. 5 is an example of a view of the changes of the screen displayed on the mobile telephone.

FIG. 4 is a flow chart showing an example of the processing sequence performed by the network game server 1 from user registration processing up to processing in respect to menu selection. FIG. 5 shows an example of the changes of the screen displayed on the mobile telephone 3. The description is continued below with reference to FIG. 4 and FIG. 5 as appropriate.

When the network game server 1 receives access from the mobile telephone 3, it transmits data to the mobile telephone 3 (step ST1) for displaying front page screen 100, and this is thereby displayed.

The front page screen 100 is constituted including a title image display section 101 that displays the title image of this game and a menu item selection section 102 whereby menu items can be selected from two menu items: "(1) GUIDANCE" and "(2) MY MENU REGISTRATION".

When the network game server 1 receives notification of the selection of "(2) MY MENU REGISTRATION" of front page screen 100 from the mobile telephone 3 employed by a user who wishes to participate in the game, it causes data for displaying the "MY MENU REGISTRATION" screen 110 to be sent to the mobile telephone 3 (step ST2) and this is thereby displayed.

The "MY MENU REGISTRATION" screen 110 includes a guidance display section 111 that displays guidance relating to my menu registration and a menu item selection section 112 whereby a single menu item can be selected from three menu items: "READ USE AGREEMENT", "AGREE" and "RETURN".

When the network game server 1 receives from the mobile telephone 3 notification of the selection of "AGREE" from the three menu items of the menu item selection section 112 of the "MY MENU REGISTRATION" screen 110, it sends data for displaying the user information screen 120 to the mobile telephone 3 (step ST3), causing this to be displayed.

The user information screen 120 includes an input section 121 for inputting the four items of user information: "NICKNAME" 122, "SUPPORTED TEAM" 123, "RIVAL TEAM" 124 and "MAIL ADDRESS" 125 and a "REGISTER" button 126 for designating "MY MENU REGISTRATION" after confirmation of input of the above items of the input section 121.

In the input section 121, "NICKNAME" 122 is the nickname of the user in this game space. In this embodiment, the network game server 1 manages the various items of user information by means of the user information management section 16, so it is not possible to register a nickname which is the same as that of another user. This therefore means that it is not possible to employ a nickname which is already in use by another user.

"SUPPORTED TEAM" 123 means the supported pro-baseball team registered by each user; in this embodiment, prescribed points are awarded when this supported team wins. It should be noted that the supported team could be the same as that supported by another user. "RIVAL TEAM" 124 is a rival pro-baseball team registered by each user; in this embodiment, prescribed points are awarded when this is beaten by the supported team. It should be noted that, just as in the case of the supported team, the rival team could be the same as that of another user.

In this way, even if the prediction of victory/defeat of the supported team is falsified by the actual match results in respect of the prediction of victory/defeat, since a user can be awarded points by correctly predicting victory/defeat of a rival team, even users who support weak supported teams can be given plenty of opportunity to acquire points and the user's concerns and the game content can be linked; interest of the game can thereby be further improved.

"MAIL ADDRESS" 125 is the mail address of the mobile telephone 3 employed by the user. This is employed for example by the network game server 1 in sending various types of data to the mobile telephone 3.

On receiving from the mobile telephone 3, notification of input of the prescribed input items in the input section 121 of the user information screen 120 and depression of "REGISTER" button 126, the network game server 1 ascertains (step ST4) whether or not the input items are correct, by means of the registration processing section 12. Confirmation of the input items means identifying the case where the supported team and the rival team are the same or the case where the nickname has already been registered.

If, by means of the registration processing section 12, the network game server 1 identifies that the input items are incorrect (NO in step ST4), the network game server 1 sends to the mobile telephone 3 data for displaying a screen (not shown) to prompt re-input and when this is displayed returns to step ST3. Also, if the network game server 1, by means of the registration processing section 12, ascertains that the input items are correct (YES in step ST4), it sends to the mobile telephone 3 data for displaying a password input screen 130 (step ST5) and this is thereby displayed.

The password input screen 130 includes an input section 131 for input of a user password used when playing this game and a "CONFIRMATION" button 132 for confirming the input password.

On receiving the password input screen 130 that has thus been input from the mobile telephone 3, the network game server 1, using the registration processing section 12, performs user registration (step ST6) of the user who is employing the mobile telephone 3. When the user is registered, the network game server 1 sends (step ST7) data for displaying menu screen 200 to the mobile telephone 3, causing this to be displayed.

The menu screen 200 includes an insignia image display section 201 that displays an image of the insignia etc of the team supported by the user and a menu item selection section 202 whereby the user selects a desired menu item from 12 menu items such as "(1) GET CARD!", "(2) CARD SHOP", "(3) TRADE", "(4) CARD ALBUM", "(5) CARD RANKING", "(6) CARD GIFT", "(7) MINI-GAME", "(8) CHANGE SUPPORTED TEAM", "(9) MATCH REPORT", "(10) current ranking", "(11) mail delivery setting" and "(12) PROCEDURE FOR UNSUBSCRIBING".

On receiving from the mobile telephone 3, notification of the selection of a menu item of the menu item selection section 202 of the menu screen 200, the network game server 1 performs processing relating to these selected menu items (step ST8).

Figure 6:
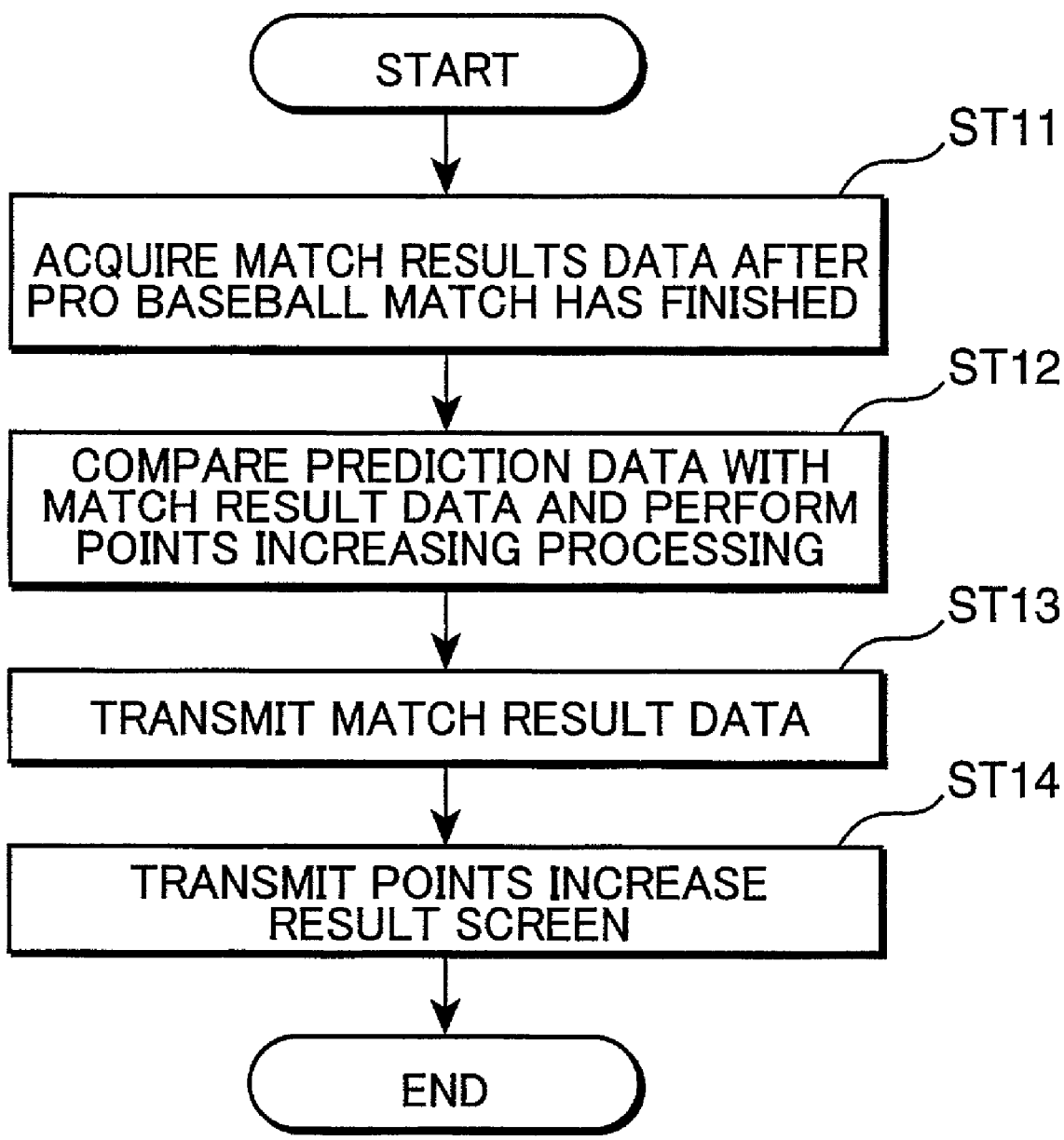
FIG. 6 is a flow chart illustrating an example of the processing procedure for results data acquisition in respect to prediction data performed by the network game server.

Next, the processing sequence performed by the network game server 1 from acquisition of the result data in respect to the prediction data up to notification of the user of the increase of points will be described. FIG. 6 is a flow chart showing an example of the processing sequence in accordance with the acquisition of result data in respect to the prediction data carried out by the network game server 1.

Using the result data acquisition section 13, the network game server 1 acquires victory/defeat result data regarding victory/defeat of each of the teams which are the supported teams or rival teams of each user (step ST11).

Using the points awarding processing section 14, the network game server 1 compares the victory/defeat prediction data of the supported teams and rival teams of each user managed by the user information management section 16 and the acquired match results data, and performs points increasing processing in respect to cases where the victory/defeat prediction data and the match result data agree and stores these in the user information storage section 22 (step ST12).

Using the communication section 11, the network game server 1 sends to the mobile telephone 3 (step ST13) the acquired match results data. If points awarding processing has been performed by the points awarding processing section 14, the network game server 1 sends (step ST14) to the mobile telephone 3 data for displaying a points increase result screen (not shown), using the communication section 11, and this is thereby displayed.

Next, the processing sequence performed by the network game server 1 in accordance with the processing for providing value data will be described.

Figure 7:
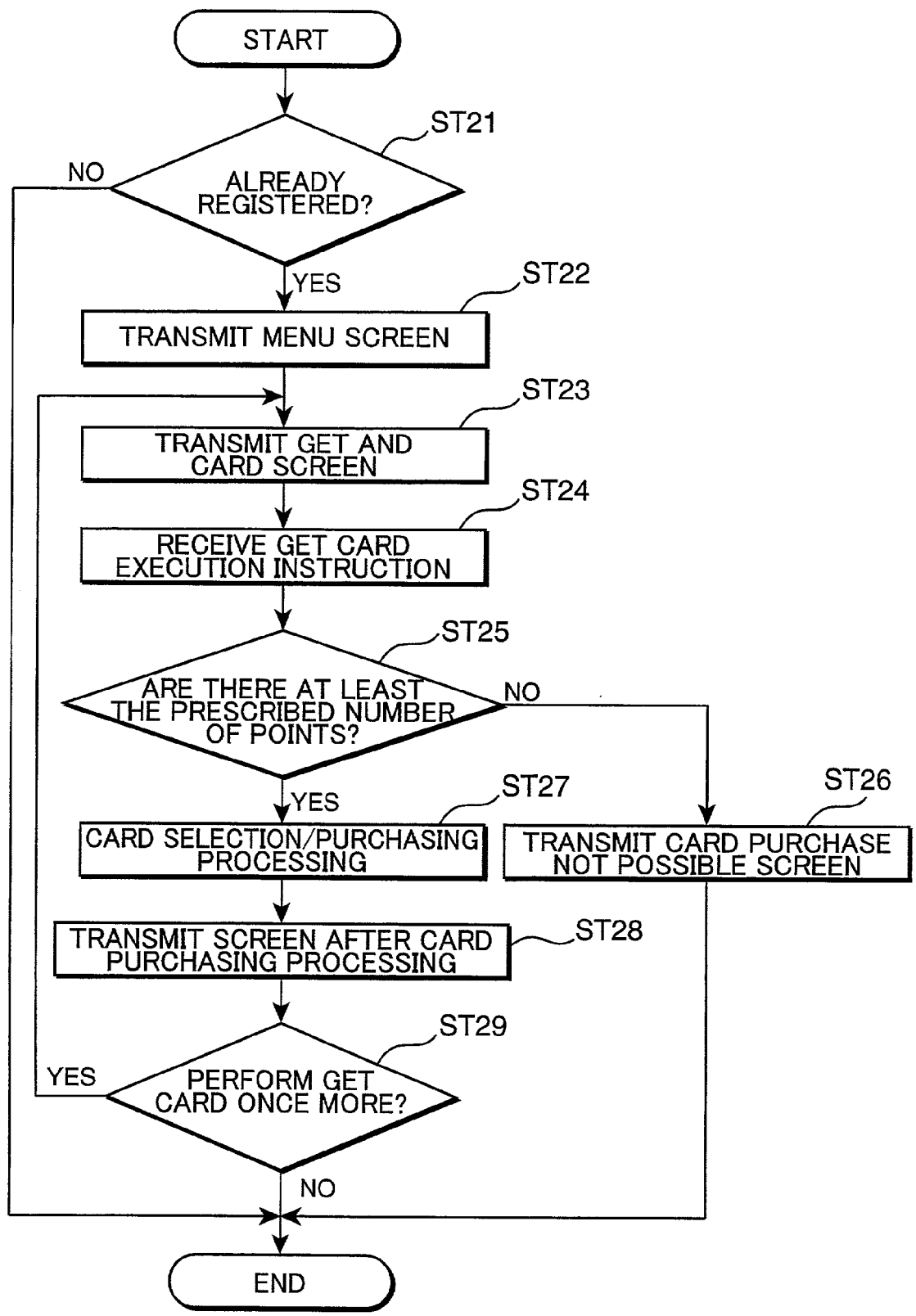
FIG. 7 is a flow chart showing an example of the processing procedure for providing value data performed by the network game server.
Figure 8:
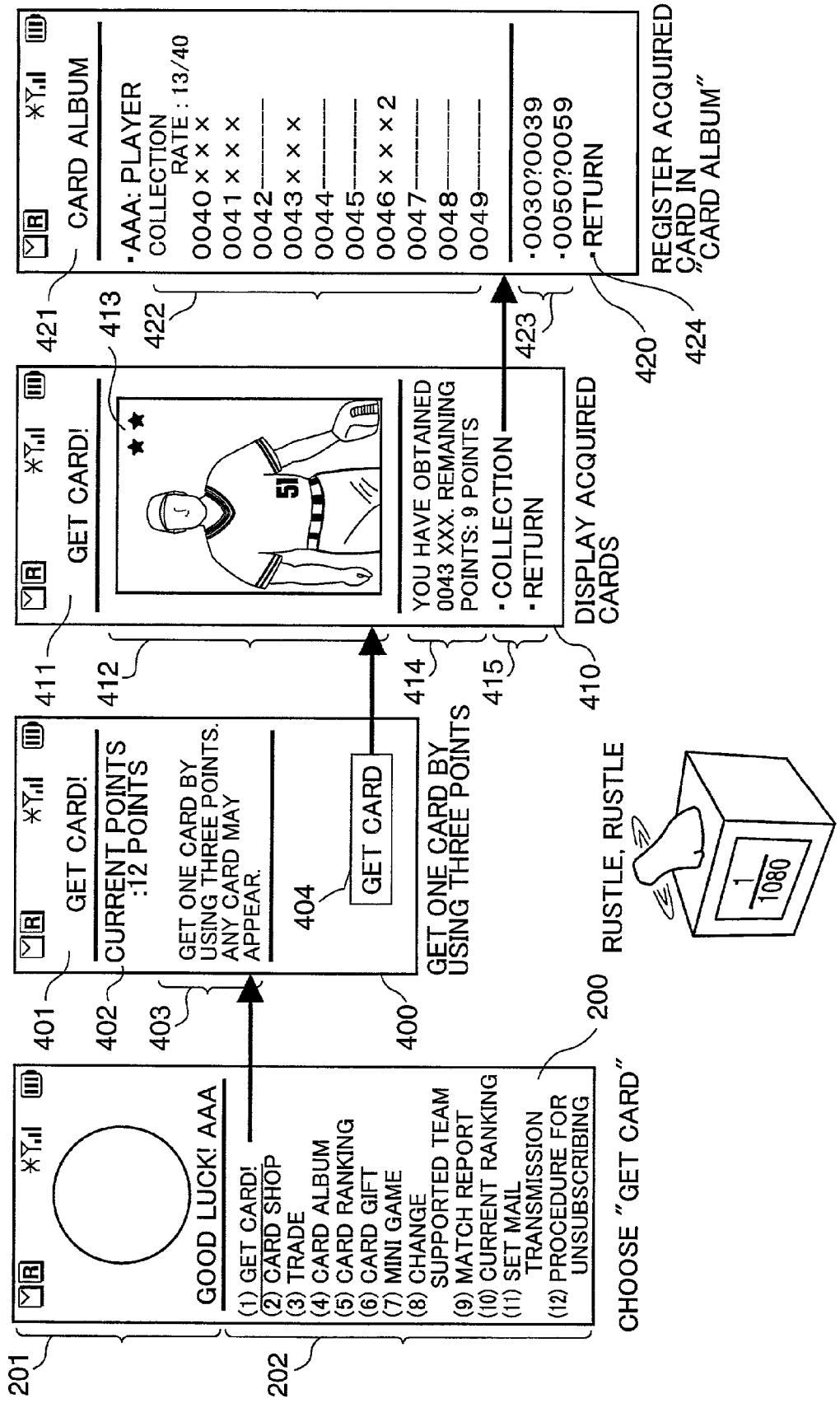
FIG. 8 is an example of a view of the changes of the screen displayed on the mobile telephone.

FIG. 7 is a flow chart illustrating an example of the processing sequence in accordance with the processing for providing value data performed by the network game server 1. FIG. 8 is an example of changed screen views displayed on the mobile telephone 3. The description is continued below with reference to FIG. 7 and FIG. 8 as appropriate.

On receiving access from the mobile telephone 3 employed by a user, the network server 1 ascertains, using the user information management section 16, (step ST21) whether or not the user employing the mobile telephone 3 is the subject of an existing user registration. If, using the user information management section 16, the network game server 1 ascertains that the user is not registered (NO in step ST21), it sends to the mobile telephone 3 data for displaying a notification screen (not shown) to the effect that user registration must be performed, and terminates the processing sequence.

Also, if, using the user information management section 16, the network game server 1 ascertains that the user is registered (YES in step ST21), it sends to the mobile telephone 3 (step ST22) data for displaying a menu screen 200, causing this to be displayed. The menu screen 200 is the same screen as the menu screen 200 described above, so description thereof is here omitted.

When the network game server 1 receives notification from the mobile telephone 3 of the selection of "(1) GET CARD!" from the menu of the menu item selection section 202 of the menu screen 200, it sends data for displaying the get card screen 400 to the mobile telephone 3 (step ST23), causing this to be displayed.

A get card screen 400 includes a selected menu item display section 401 that displays the currently selected menu item, a points display section 402 that displays the points currently acquired by the user, a guide section 403 that describes in simple terms the effect of "GET CARD!", and a get card button 404 for executing "GET CARD".

When the network game server 1 receives from the mobile telephone 3 notification that the execution button 404 displayed by "GET CARD" of the menu screen 400 has been pressed, using the communication section 11, it receives (step ST24) from the mobile telephone 3 instructions for execution of "GET CARD". Using the user information management section 16, the network game server 1 then reads from user information storage section 22 the points currently acquired by the user and ascertains whether or not these are greater than or equal to the prescribed points (step ST25).

If, using the user information management section 16, the network game server 1 ascertains that the current points of the user have not reached the prescribed number of points (NO in step ST25), using the communication section 11, it sends (step ST26) to the mobile telephone 3 data for displaying a "CARD PURCHASE NOT POSSIBLE" screen (not shown), causing this to be displayed and terminates the processing sequence.

Also, if, using the user information management section 16, the network game server 1 ascertains that the current number of points of the user is equal to or greater than the prescribed number of points (YES in step S25), using the value data provision processing section 15, it extracts a single item of value data randomly from the value data stored in the value data storage section 21 and stores this extracted value data in association with the user in the user information storage section 22 and subtracts from the user information storage section 22 a number of points determined in accordance with the value data provided (step ST27).

Using the value data inspection processing section 17, the network game server 1 sends to the mobile telephone 3 data for displaying an acquired card image screen 410 (screen after card purchase processing) after execution of "GET CARD", processed so as to make the extracted value data viewable at the mobile telephone 3 (step ST28), causing this to be displayed.

It should be noted that, when sending data for displaying the acquired card image screen (screen after card purchase processing) 410 to the mobile telephone 3, the network game server 1 sends this to the mobile telephone 3 after performing prescribed data processing, by means of the value data inspection processing section 17 so as to make it impossible for the card image to be copied at the mobile telephone 3. Thereafter, when sending to the mobile telephone 3 data for displaying a screen including a card image, the network game server 1 uses the value data inspection processing section 17 to send to the mobile telephone 3 data for displaying a screen including a card image after performing prescribed data processing so as to make it impossible for the card image to be copied at the mobile telephone 3. Consequently, illicit user actions such as copying card images at the user end can be prevented and the user can inspect the desired image data, so the game can be conducted in a trouble-free fashion while satisfying the user's consciousness of possession of the card image.

The acquired card image display screen 410 includes a selected menu item display section 411 that displays the currently selected menu item, a card image display section 412 that displays the acquired card image, a game condition display section 414 that displays the user's balance of points after "GET CARD" and the identification number of the acquired card image, and a menu item selection section 415 whereby a single menu item may be selected from the two menu items "COLLECTION" and "RETURN".

Also, the two stars displayed at the top right of the card image displayed in an image display section 412 indicate the degree of difficulty of acquisition of this image data. For example a single star indicates a normal card, two stars indicate a rare card, and three stars indicate an ultra-rare card. The larger the number of stars, the greater therefore is the difficulty for the user in acquiring the card. The number of card ranks is not restricted to three but could be more or less than this. It should be noted that the indication of the degree of difficulty of acquisition (a rarity) of the card image is not restricted to the insignia etc referred to above but could be achieved for example by other insignia or by altering the background color of a card image display section 412. Furthermore, there is no restriction regarding the position of the insignia on the card image so long as this can be ascertained by the user from the monitor etc of the mobile telephone 3.

Thus, the user can appreciate the difficulty of acquiring card images which are small in number, i.e., rare, so the interest of the game can be heightened and the user can be motivated to continue the game; thus smooth operation can be achieved with the game being played continuously.

When the user further performs the "GET CARD" operation in order to acquire a card image, the network game server 1, on receiving from the mobile telephone 3 notification that the "RETURN" button of the menu item selection section 415 of the acquired image display screen 410 has been pressed, transmits to the mobile telephone 3 data for displaying the get card screen 400 (YES in step ST29), causing this to be displayed and the same sequence to be repeated by returning to step ST23. The network game server 1 then terminates the sequence of the series of processes, unless "GET CARD" is again performed.

If it receives from the mobile telephone 3 notification that the "COLLECTION" button of the menu item selection section 415 of the acquired card image display screen 410 has been selected, the network game server 1 sends data for displaying a card album screen 420 to the mobile telephone 3, causing this to be displayed.

The card album screen 420 includes a selected menu item display section 421 that displays the currently selected menu item, and an acquired card list display section for 422 that displays a tabular list of card images currently acquired by the user, a group designation section 423 that designates a group of card images which are grouped with a prescribed classification (for example in teams) and a return button 424 for returning to the previous screen.

The acquired card list display section 422 displays a table of the card images acquired by the user at the current time point. AAA indicates for example the name of the pro-baseball team. Also, in the collection rate, indicated by 13 (numerator)/40 (denominator), the denominator portion indicates the total of card images of players of team AAA managed by the network game server 1 beforehand. The numerator portion indicates the acquired total of card images of players of team AAA acquired by the user at the current time point.

Also, in the acquired card list display section 422, in the portion 0040 XXX~0049 - - -, XXX indicates player names and the - - - portion indicates that, at the current time point, the user has not yet acquired a card image of this identification number. Consequently, since a display of the collection ratio is included in the screen displayed on the mobile telephone 3, the user is able to grasp which are the card images which he has not yet been able to collect, by for example glancing at this. Also, the user can easily grasp the situation regarding collection of each team by displaying the collection rate for each pro-baseball team.

Next, the processing sequence based on exchange of value data and points performed by the network game server 1 will be described.

Figure 9:
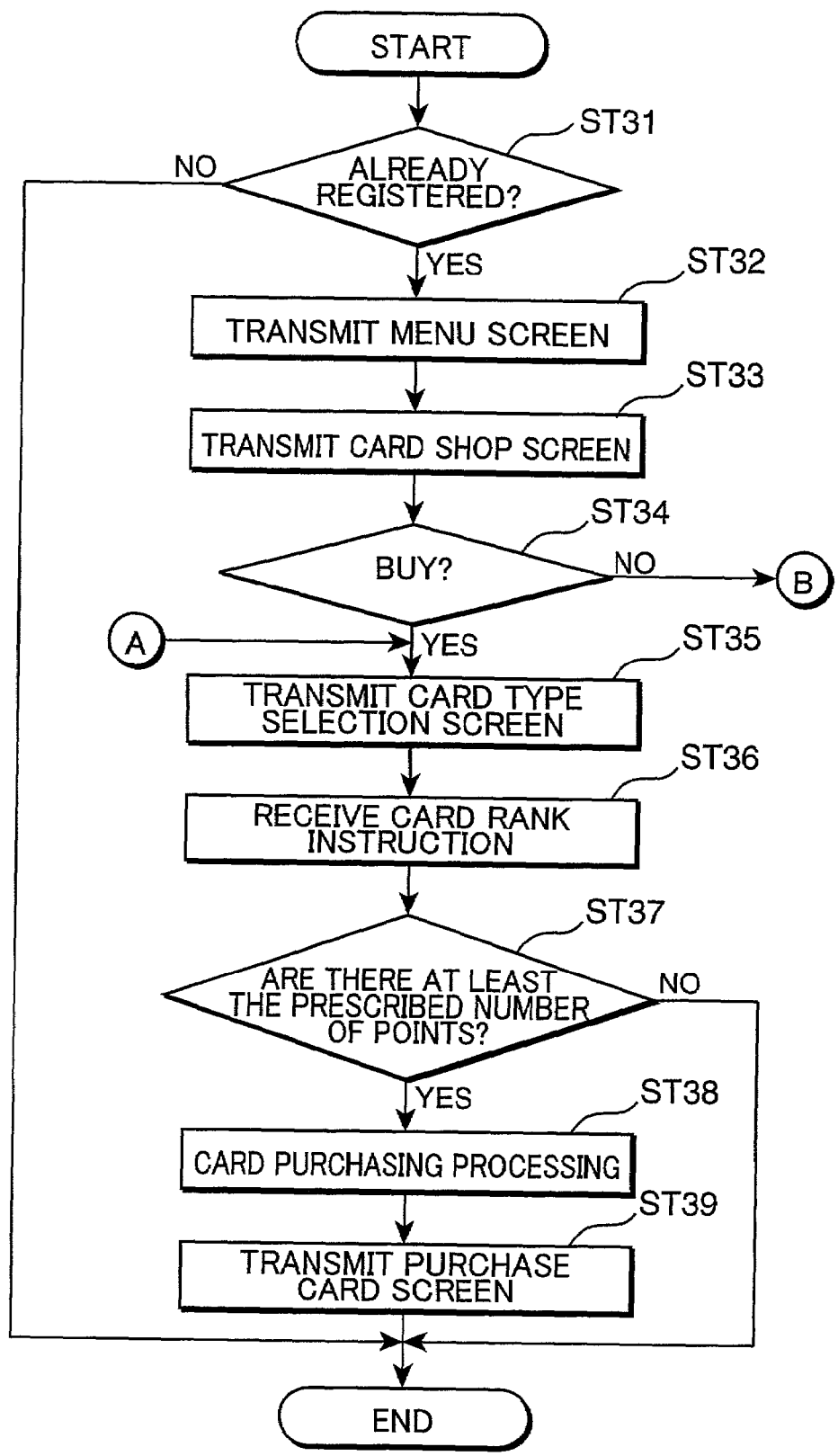
FIG. 9 is a flow chart illustrating an example of the processing procedure for exchange of value data and points performed by the network game server.
Figure 10:
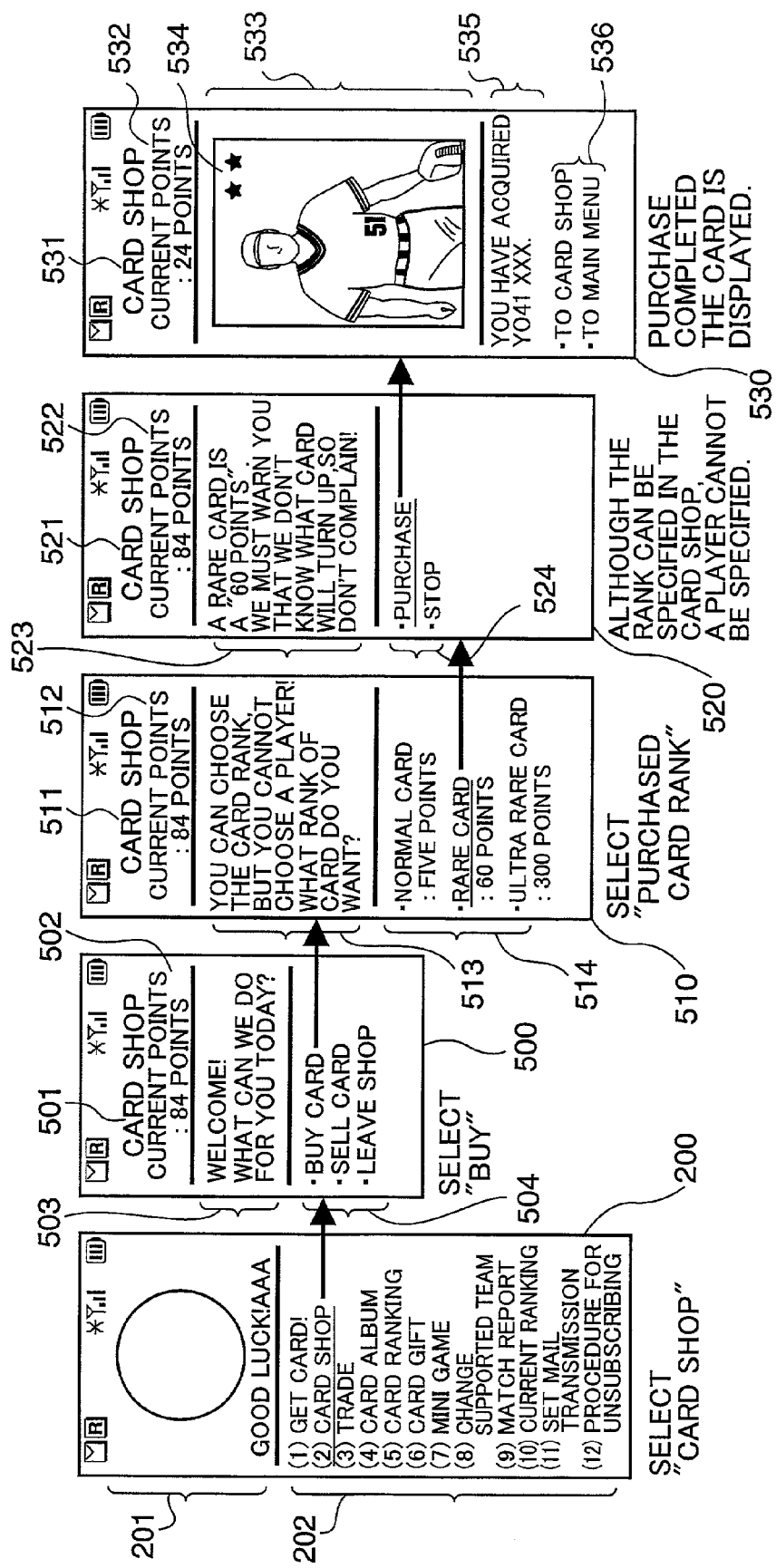
FIG. 10 is an example of the changes of the screen displayed on the mobile telephone.

FIG. 9 is a flow chart showing an example of the processing sequence based on exchange of value data and points performed by the network game server 1. FIG. 10 is an example of a view of the screen changes displayed on the mobile telephone 3. The description is continued below with reference to FIG. 9 and FIG. 10 as appropriate.

When the network game server 1 receives access from the mobile telephone 3 employed by a user, by means of the user information management section 16, it ascertains (step ST31) whether or not the user employing the mobile telephone 3 is already registered. If the network game server 1 ascertains by means of the user information management section 16 that the user is not registered (NO in step ST31), it sends data for displaying a notification screen (not shown) for example to the effect that user registration must be performed to the mobile telephone 3 and terminates the processing sequence.

Also, if the network game server 1 ascertains by the user information management section 16 that the user is registered (YES in step ST31), it sends data for a displaying menu screen 200 to the mobile telephone 3 (step ST32) so that this is displayed. The menu screen 200 is the same screen as the menu screen 200 described above, so description thereof is here omitted.

On receiving notification of selection of "(2) CARD SHOP" from the menu item selection section 202 of the menu screen 200 from the mobile telephone 3, the network game server 1 sends data for displaying card shop screen 500 to the mobile telephone 3 (step ST33), causing this to be displayed.

A card shop screen 500 includes a selected menu item display section 501 that displays the currently selected menu item, a points display section 502 that displays the points currently acquired by the user, a guide section 503 to assist user input, and a menu item selection section 504 whereby a single menu item is selected from the three menu items "BUY CARD", "SELL CARD" and "LEAVE SHOP".

When the network game server 1 receives from the mobile telephone 3 a selection instruction whereby "BUY CARD" of the menu item selection section 504 is selected ("BUY" in step ST34), it sends to the mobile telephone 3 (step ST35) data for displaying a card type selection screen 510 for selection of the type (rank) of the card to be purchased, causing this to be displayed.

Figure 11:
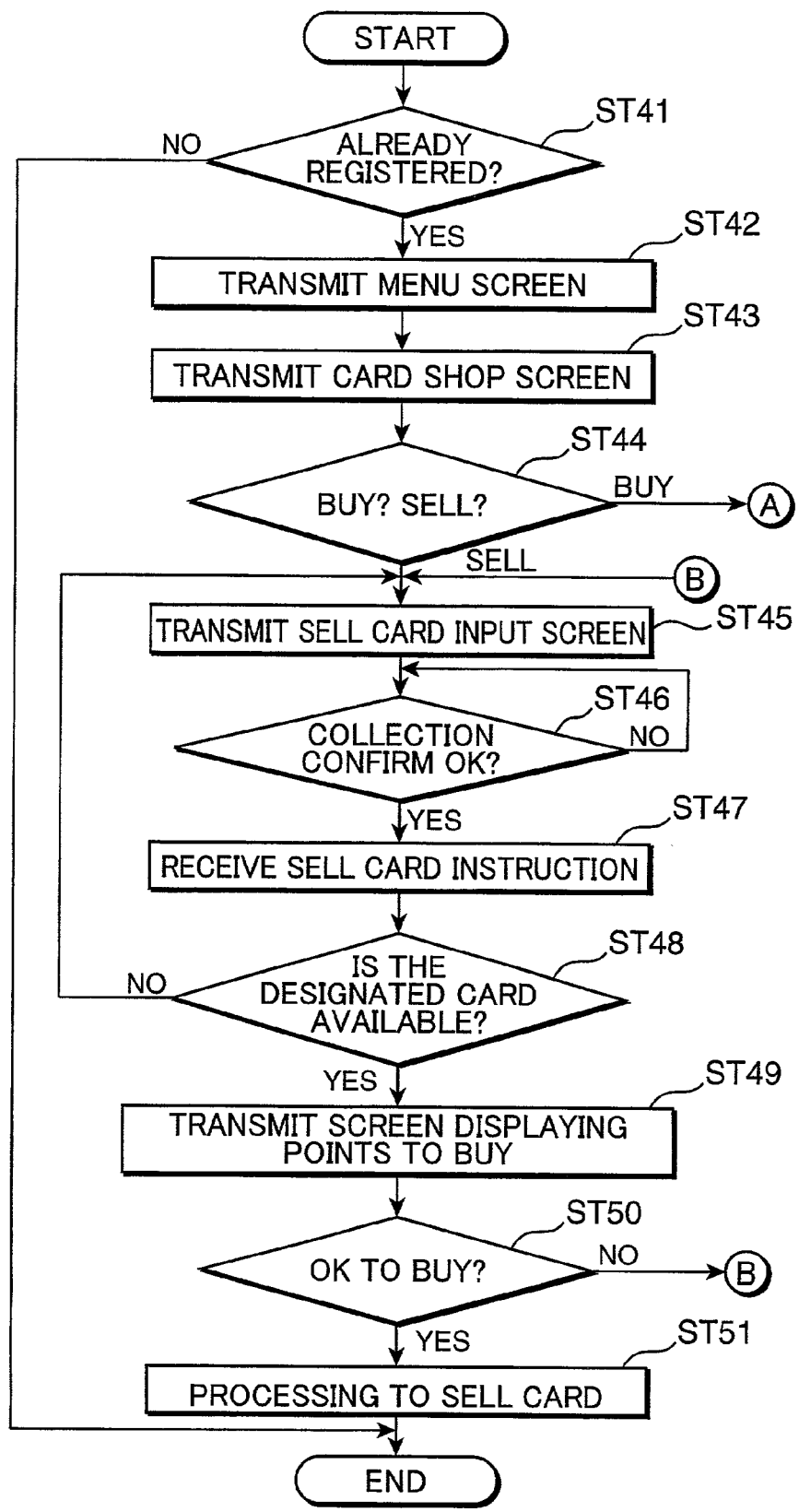
FIG. 11 is a flow chart illustrating an example of the processing procedure for exchange of value data and points performed by the network game server.

Also, if the network game server 1 receives a selection instruction that selects "BUY CARD" of the menu item selection section 504 ("SELL" in step ST34), it advances to step ST45 shown in FIG. 11. It should be noted that, if the network game server 1 receives a selection instruction selecting "LEAVE SHOP" of the menu item selection section 504, the processing sequence performed by the network server 1 is terminated.

The card type selection screen 510 includes a selected menu item display section 511 that displays the menu item that is currently selected, a points display section 512 that displays the points currently acquired by the user, a guide section 513 for assisting user input, and a menu item selection section 514 whereby a single menu item is selected from three menu items: "NORMAL CARD", "RARE CARD" and "ULTRA-RARE CARD".

The "NORMAL CARD", "RARE CARD" and "ULTRA-RARE CARD" displayed by the menu item selection section 514 are ranked in accordance with the points necessary to acquire these. For example, as displayed on the menu item selection section 514, five points are required to acquire a "NORMAL CARD", 60 points to acquire a "RARE CARD" and 300 points to acquire an "ULTRA RARE CARD", progressively more points being required in this order. The user can therefore easily imagine the value of the card image and, in addition, is motivated to acquire a desired card image by accumulating points.

When the network game server 1 receives (step ST36) from the mobile telephone 3 selection instructions of the menu item selection section 514 to select a "RARE CARD", by means of the communication section 11, it sends to the mobile telephone 3 data for displaying a card purchase intention confirmation screen 520 to confirm the user's intention to purchase the card and this is thereby displayed.

The card purchase intention confirmation screen 520 includes a selected menu item display section 521 displaying the currently selected menu item, a points display section 522 for displaying points currently acquired by the user, a guide section 523 for assisting user input in "CARD SHOP" and a menu item selection section 524 for selecting a single menu item from the two menu items: "PURCHASE" and "STOP".

When the network game server 1 receives a selection instruction to select "PURCHASE" of the menu item selection section 524 of the card type screen 520, the network game server 1, by means of the user information management section 16, reads the current number of points of the user from the user information storage section 22 and ascertains whether this is or is not at least the prescribed number of points (step ST37).

If the network game server 1 ascertains (NO in step ST37) by means of the user information management section 16 that the user's current points have not reached the number of points laid down corresponding to the card rank to be purchased, by using the communication section 11, it sends to the mobile telephone 3 data for displaying a screen to the effect that card purchase is not possible, causing this to be displayed; the processing sequence is then terminated.

Also, if the network game server 1 ascertains by means of the user information management section 16 (YES in step ST37) that the user's current points have reached the points corresponding to the card rank that is to be purchased, it uses the value data provision processing section 15 to extract a single item of card image data randomly from the rank selected by the user and stored in the value data storage section 21, stores the extracted value data in association with the user in user information storage section 22 and subtracts points corresponding to the value data thus provided and stores the result in the user information storage section 22 (step ST38).

The network game server 1 then uses the communication section 11 to send (step ST39) to the mobile telephone 3 data for displaying a purchased card screen 530 after execution of card purchase processing whereby the value data extracted is displayed in a fashion such that it can be inspected at the mobile telephone 3; this is thereby displayed and the processing sequence performed by the network game server 1 is terminated. Even when sending to the mobile telephone 3 data for displaying the purchased card screen 530, the network game server 1 sends the data for displaying a screen including the card image to the mobile telephone 3 by the communication section 11 after performing prescribed data processing by means of the value data inspection processing section 17 so as to prevent copying at the mobile telephone 3.

The purchased card screen 530 includes a selected menu item display section 531 for displaying the currently selected menu item, a points display section 532 for displaying the points currently acquired by the user, a card image display section 533 for displaying the acquired card image, an acquired card data display section 535 for displaying the identification number of the acquired card image and a menu item selection section 536 for displaying a single menu item of the two menu items: "TO CARD SHOP" and "TO MAIN MENU". Also, the two stars displayed at the top right of the card image displayed in the image display section 534 indicate the degree of difficulty of acquiring this image data; thus this is the same as the get card screen 410 after execution of "GET CARD" as described above, so further description thereof is omitted.

Next, the processing procedure for exchange of value data and points performed by the network game server 1 will be described.

Figure 12:
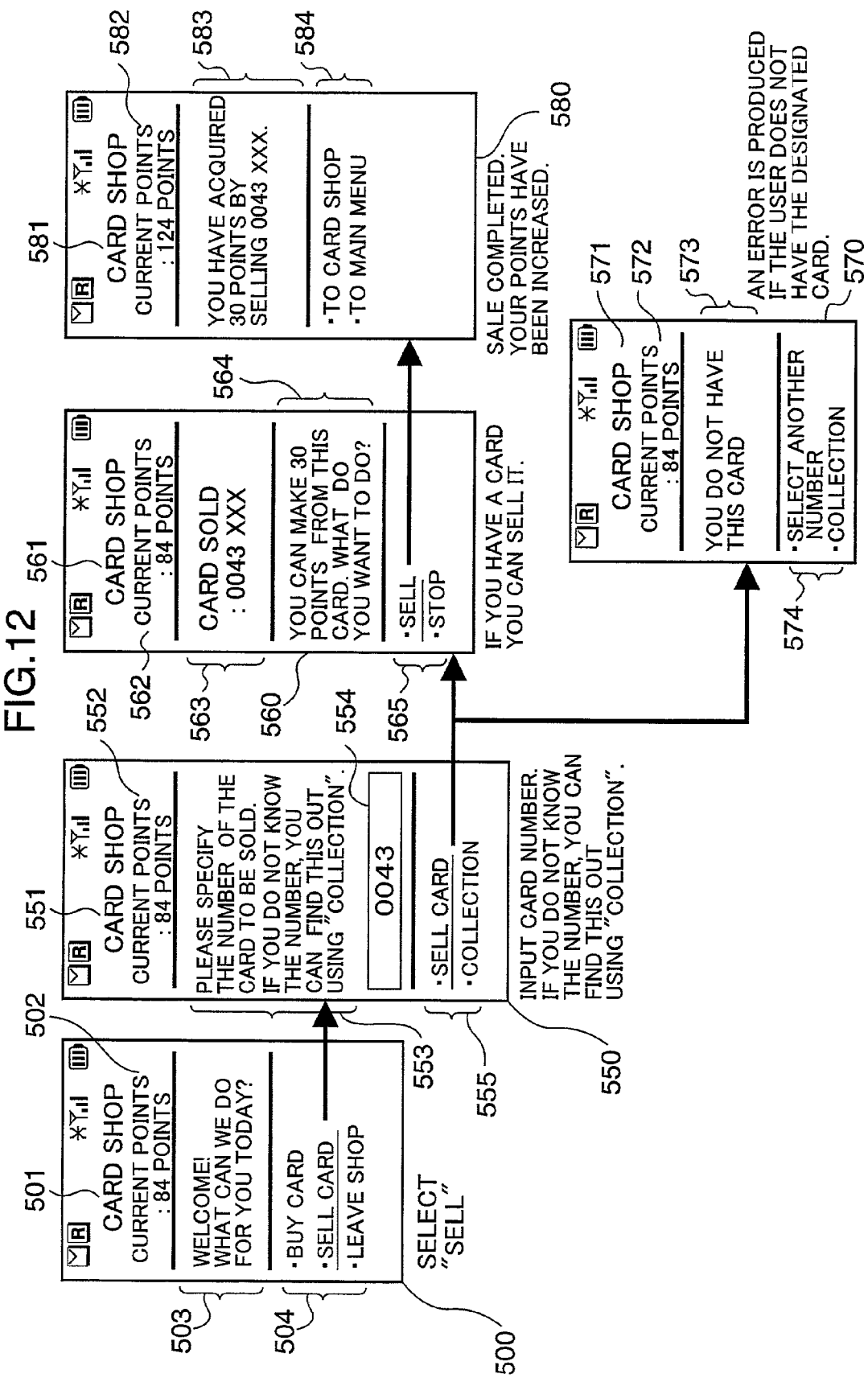
FIG. 12 is an example of the changes of the screen displayed on the mobile telephone.

FIG. 11 is a flow chart showing an example of a processing procedure for exchange of value data and points performed by the network game server 1. FIG. 12 is an example of the change of screens displayed on the mobile telephone 3. The description will be continued below with appropriate reference to FIG. 11 and FIG. 12.

When the network game server 1 receives access from the mobile telephone 3 employed by a user, by means of the user information management section 16, it ascertains (step ST41) whether or not the user who is employing the mobile telephone 3 is already registered. If the network game server 1 ascertains by means of the user information management section 16 that the user is not registered (NO in step ST41), it sends to the mobile telephone 3 data for displaying for example a notification screen (not shown) to the effect that user registration should be performed, and terminates the processing sequence.

Also, if the network game server 1 ascertains by means of the user information management section 16 that the user is registered (YES in step ST41), it sends (step ST42) to the mobile telephone 3 data for displaying a menu screen 200, causing this to be displayed. Since the menu screen 200 is the same as the menu screen 200 described above, further description thereof is omitted.

When the network game server 1 receives from the mobile telephone 3 selection instructions to select "(2) CARD SHOP" of the menu item selection section 202, it sends (step ST43) data for displaying a card shop screen 500 to the mobile telephone 3, causing this to be displayed. The card shop screen 500 has been described above, so further description thereof is omitted.

When the network game server 1 receives selection instructions to select "SELL CARD" of the menu item selection section 504 of the card shop screen 500 ("SELL" in step ST44), using the communication section 11, it sends data for displaying a sell card input screen 550, for inputting of the number of the card to be sold, to the mobile telephone 3 (step ST45) and this is thereby displayed.

Also, when the network game server 1 receives selection instructions to select "BUY CARD" of the menu item selection section 504 of the card shop screen 500 ("BUY" in step ST44), it advances to step ST35. It should be noted that, if the network game server 1 receives selection instructions to select "LEAVE SHOP" of the menu item selection section 504 of the card shop screen 500, the processing sequence performed by the network game server 1 is terminated.

The sell card input screen 550 includes a selected menu item display section 551 that displays the currently selected menu item, a points display section 552 that displays the points currently acquired by the user, a guidance section 553 for assisting user input, a card number input section 554 whereby the number of the card to be sold is input, and a menu item selection section 555 whereby a single menu item is selected from the two menu items "SELL CARD" and "COLLECTION".

If the user does not know the number of the card to be sold in the card shop, when the network game server 1 receives from the mobile telephone 3 selection instructions to select "COLLECTION" of menu item selection section 555 (NO in step ST46), using the communication section 11, it sends to the mobile telephone 3 data for displaying the card album screen 420, causing this to be displayed. Since the card album screen 420 has been described above, further description thereof is omitted. The user can confirm which card image he has currently acquired by viewing the card album screen 420.

If the network game server 1 has not received selection instructions selecting "COLLECTION" of the menu item selection section 555 (YES in step ST46), using the communication section 11, the network game server 1 receives a sell card designation instruction designating the card desired to be sold designated by the user (step ST47).

Once the network game server 1 has received an instruction designating sale of a desired card from the mobile telephone 3, it uses the user information management section 16 to determine (step ST48) whether or not the card designated by the user is stored in the user information storage section 22. If it determines that the card designated by the user is stored in the user information storage section 22 (YES in step ST48), the network game server 1 sends data for displaying a purchasing points display screen 560 to the mobile telephone 3 (step ST49), causing this to be displayed.

The purchasing points display screen 560 includes a selected menu item display section 561 that displays the currently selected menu item, a points display section 562 that displays the points currently acquired by the user, a card number display section 563 that displays the card number input by the user, a purchase price display section 564 that displays the purchase price of the card input by the user, and a menu item selection section 565 that selects a single menu item from the two menu items "SELL" and "STOP".

Also, if the network game server 1 determines, by using the user information management section 16, that the card designated by the user is not stored in the user information storage section 22 (NO in step ST48), it sends data for displaying an error screen 570 to the mobile telephone 3, causing this to be displayed, and returns to step ST45. The user must then again select a card image to be sold.

The error screen 570 includes a selected menu item display section 571 that displays the currently selected menu item, a points display section 572 that displays the points currently acquired by the user, a display section 573 that displays whether or not the user is in possession of the card image input by the user and a menu item selection section 574 that selects a single menu item of two menu items "RE-SELECT NUMBER" and "COLLECTION".

When the network game server 1 receives from the mobile telephone 3 a selection instruction whereby "SELL" of the menu item selection section 565 of the purchasing points display screen 560 is selected (step ST50), using the points awarding processing section 14, it deletes from the user information storage section 22 the association of the card image designated by the user and performs processing to add to the user information storage section 22 the points displayed in the card acquisition display section 564 of the purchasing points display screen 560 (step ST51).

The network game server 1 sends to the mobile telephone 3 data for displaying a sale confirmation screen 580, causing this to be displayed. The sale confirmation screen 580 includes a selected menu item display section 581 that displays the currently selected menu item, a points display section 582 that displays the points currently acquired by the user, an awarded points display section 583 that displays the points awarded to the user and a menu item selection section 584 that selects a single menu item from the two menu items "TO CARD SHOP" and "TO MAIN MENU".

Next, the processing sequence performed by the network game server 1 in response to a request to inspect value data from the user will be described.

Figure 13:
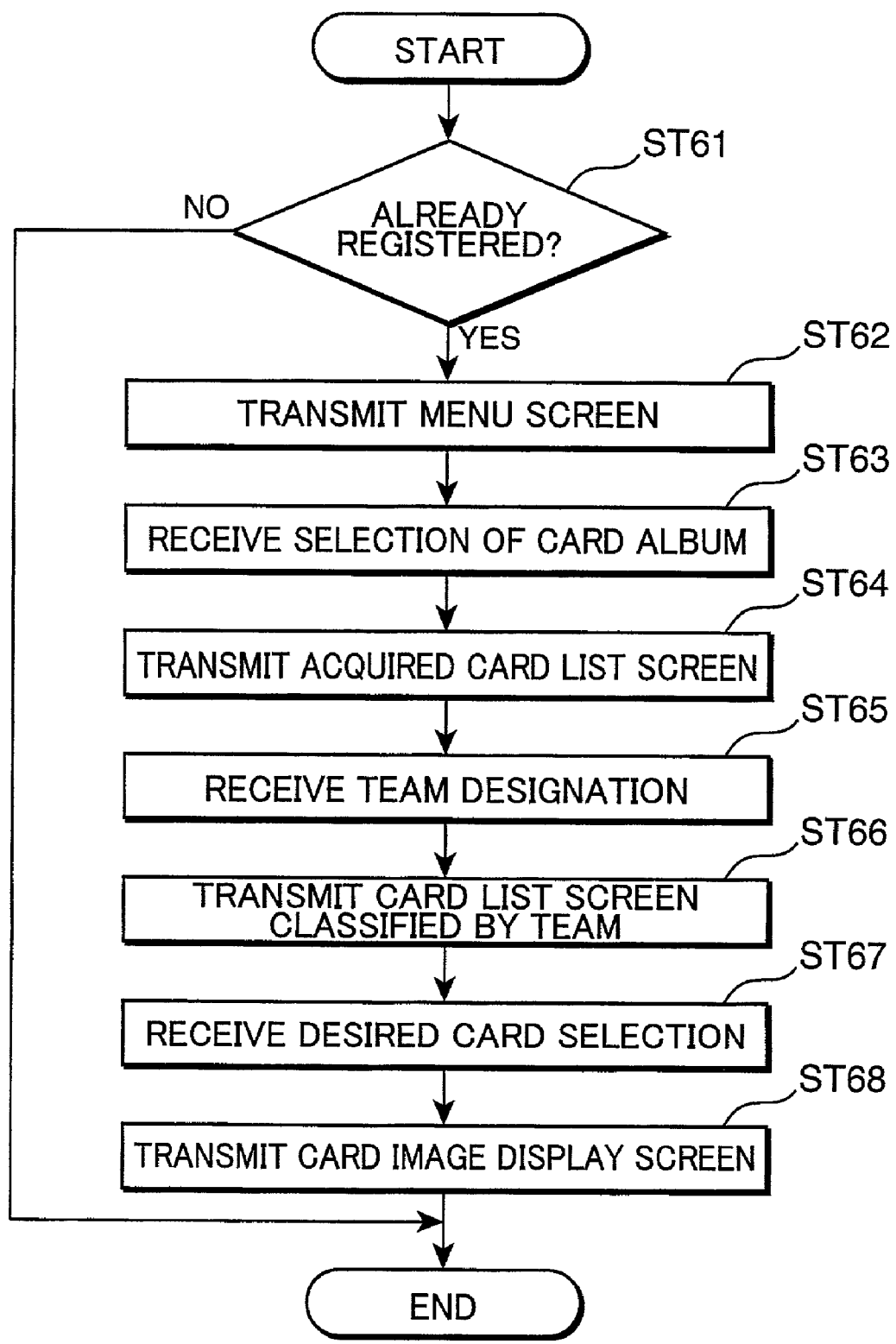
FIG. 13 is a flow chart illustrating an example of the processing procedure performed by the network game server in accordance with a request from a user to inspect value data.
Figure 14:
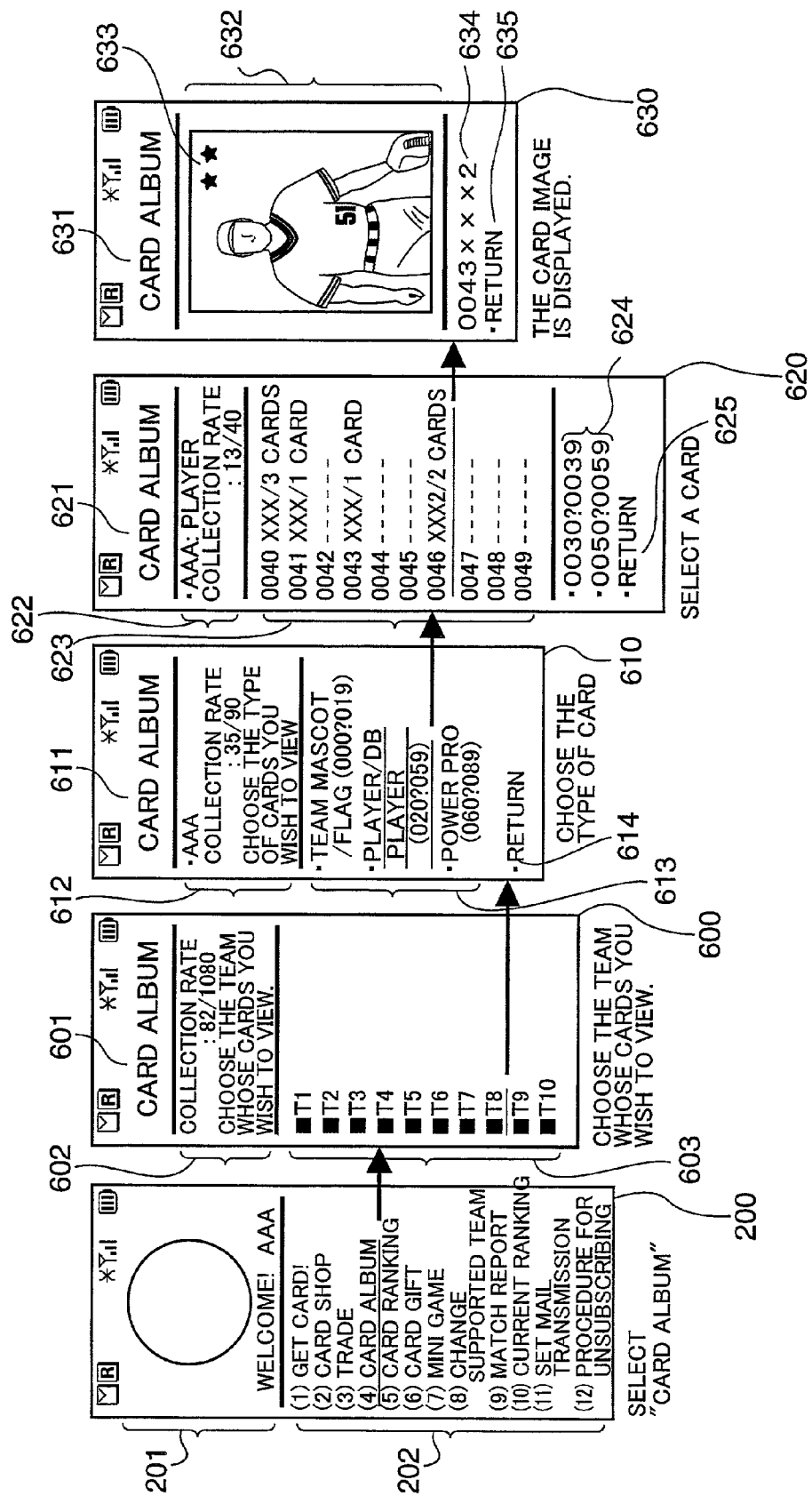
FIG. 14 is an example of a view of the changes of the screen displayed on the mobile telephone.

FIG. 13 is a flowchart that shows an example of the processing sequence performed by THE network server 1 in response to a request to inspect value data from the user. FIG. 14 is an example of a view of the screen changes displayed on the mobile telephone 3. The description will be continued hereinbelow with appropriate reference to FIG. 13 and FIG. 14.

When the network game server 1 receives access from the mobile telephone 3 employed by a user, by means of the user information management section 16, it determines whether or not the user employing the mobile telephone 3 is already registered (step ST61). If the network game server 1 ascertains (NO in step ST61) by means of the user information management section 16 that the user is not registered it sends to the mobile telephone 3 data for displaying for example a notification screen (not shown) to the effect that user registration must be performed and terminates the processing sequence.

Also, if the network game server 1 determines by means of the user information management section 16 that the user is registered (YES in step ST61), it sends (step ST62) to the mobile telephone 3 data for a displaying menu screen 200, causing this to be displayed. Since the menu screen 200 is the same as the menu screen 200 previously described, further description thereof is omitted.

When the network game server 1 receives (step ST63) from the mobile telephone 3 a selection instruction that selects "(4) CARD ALBUM" from the menu item selection section 202 of the menu screen 200, using the communication section 11, it sends to the mobile telephone 3 (step ST64) data for displaying an acquired card list screen 600, causing this to be displayed.

The acquired card list screen 600 includes a menu item selection section 601 that displays the currently selected menu item, a collection rate display section 602 that displays the user's current rate of collecting card images and a team selection section 603 for selecting card images, classified by team.

The collection rate display section 602 displays the state of collection of card images acquired by the user at the current time point. If the collection rate is indicated by 82 (numerator)/1080 (denominator), the denominator portion indicates the total number of card images managed beforehand by the network server 1. The numerator portion indicates the total number of collected card images acquired by the user at the current time point. Also, in the team selection section 603, T1 to T10 indicate the names of pro-baseball teams.

When the network game server 1 receives (step ST65) from the mobile telephone 3 a request to inspect card image data relating to "T8" of the team selection section 603, using the user information management section 16, it reads the card data already collected by the user corresponding to the inspection request stored in the user information storage section 22 and sends to the mobile telephone 3 (step ST66) data for displaying a card list screen 610 classified by team, causing this to be displayed.

The card list screen 610 classified by team includes a selected menu item display section 611 that displays the currently selected menu item, a collection rate display section 612 classified by team that expresses the user's current collection rate of card images for each team, a category heading display section 613 wherein the cards of teams corresponding to the user's inspection request are classified under headings for each category and a "RETURN" button 614 for returning to the previous screen.

The collection rate display section 612 classified by team displays the state of collection of card images acquired by the user at the current time point. If the collection rate is expressed by 35 (numerator)/90 (denominator), the denominator portion indicates the total of card images of the team corresponding to the user's inspection request managed beforehand at the network game server 1. The numerator portion indicates the collected total of card images of the teams acquired by the user at the current time point. The category heading display section 613 indicates the type of card image, such as for example "TEAM MASCOT/FLAG", "PLAYER/DB PLAYER" and "POWER PRO".

When the network game server 1 receives from the mobile telephone 3 a selection instruction that selects "PLAYER/DB PLAYER" of the category heading display section 613 of the card list screen 610 classified by the team, it sends to the mobile telephone 3 data for displaying a collection condition display screen 620 classified by category, causing this to be displayed.

The collection condition display screen 620 classified by category includes a selected menu item display section 621 that displays the currently selected menu item, a collection rate display section 622 classified by team that displays the current collection rate of the teams selected by the user, a number of cards collected display section 623 that displays the number of each card collected, a selection section 624 for displaying the number of cards collected for each card corresponding to the identification numbers thereof and the return button 614 for returning to the previous screen. The user can easily grasp which card images are duplicated by displaying the number of card images acquired in the form "0046 XXX 2/2 cards" in number of cards collected display section 623.

When the network game server 1 receives from the mobile telephone 3 an inspection request (step ST67) for inspecting card images corresponding to "0046 XXX 2/2" of number of the collected cards display section 623, by using the communication section 11, it sends to the mobile telephone 3 (step ST68) data for displaying a card image display screen 630 that displays card images corresponding to the inspection request; and these are thereby displayed and the processing sequence performed by the network game server 1 is terminated. By means of the value data inspection processing section 17, the network game server 1 sends the data for displaying the card image display screen 630 to the mobile telephone 3 by the communication section 11 after performing prescribed data processing such that the data cannot be copied at the mobile telephone 3.

The card image display screen 630 includes a selected menu item display section 631 that displays the currently selected menu item, a display section 632 that displays a card image whose inspection is requested by the user, a card identification information display section 634 that displays the identification number and player name etc of the acquired card image, and a return button 634 for returning to the preceding screen. The card rank mark 633 (stars) in the top right of the card image displayed on card image display section 632 indicates the degree of difficulty of acquiring this card data. In this case, there are two stars, indicating that this is a rare card.

As described above, the user can make predictions regarding the phenomenon to be predicted such as the result in terms of winning or losing for example a pro-baseball match and the feeling of anticipation of the user regarding acquisition of a card image to be finally provided can be increased, so the interest of the game itself can be increased and the user can acquire card images of desired pro-baseball players etc by continuously increasing the points; the user can therefore be given a feeling of continuous anticipation of being able to acquire card images of desired pro-baseball players in accordance with the progress of the game.

Also, the user can check by accessing the network server 1 the points and card images that the user has accumulated in accordance with the progress of the game and so can grasp as required the state of progress of the game at the time point of this check; also, dishonest actions by the user such as copying and alteration of the points and card images awarded to the user can be prevented, thereby enabling the game to be conducted in a smooth fashion.

Also, since card images are provided to the user in accordance with a user request for provision of value data, the user can be given a feeling of anticipation of being able to acquire at any time value in accordance with the points accumulated by successful predictions of for example results of pro-baseball matches.

In addition, since it is possible to convert these card images into points if the user decides that the acquired card image is not required, or to convert duplicated card images into points if the card images acquired by the user are duplicated etc, by returning card images to points as required the user can utilize these as points for acquisition of desired new card images.

Also, by making it possible to appreciate the difficulty of acquiring card images that are small in number, i.e., rare, the interest of the game can be increased and the user can be motivated to continue the game, enabling the game to be conducted continuously in a smooth fashion.

Also, if things go well for the user, the user can acquire card images which are small in number, i.e., rare, so even users who have small points can be presented with opportunities to acquire desired card images.

Also, since a user who has acquired a large number of points is prompted to acquire card images in accordance with these acquired points the user can easily learn that card images can be acquired, without needing to check the acquired points.

Furthermore, since dishonest actions by the user such as copying at the user end can be prevented and the user can inspect the desired image data, the game can be conducted in a smooth fashion whilst satisfying the user's consciousness of possession of the card images.

Also, even if the user's prediction of winning/losing by the user's supported subject is belied by the actual results in respect to the prediction data, since the user can be awarded points by a correct prediction of winning/losing of a non-supported team, even users who support weak teams can be given plenty of opportunities to acquire points and the user's concerns and the game content can be linked so the interest of the game can be further improved.

An inventive network game server device performs transmission and reception of data with a terminal device employed by a user through a network, and comprises: prediction data registration means that receives from terminal device prediction data corresponding to the content of prediction by the user regarding an actual phenomenon that may occur in the future and registers received prediction data in association with the user; result data acquisition means that acquires the phenomenon that actually occurred in respect to the prediction data as result data; point awarding means that awards prescribed points to the user registered in association with the prediction data if the result data and the prediction data satisfy a predetermined condition; and value data provision means that provides value data having a prescribed value in accordance with the points to the user.

Prediction data corresponding to the user's prediction content in respect to an actual phenomenon that may occur in the future is received from the terminal device and the received prediction data is registered in association with this user. The phenomenon that actually took place in respect to the registered prediction data is then acquired as result data and, if the acquired result data and the registered prediction data satisfy a predetermined condition, prescribed points are awarded to the user registered in association with this prediction data and value data having a prescribed value depending on the awarded points is provided to the user.

In this way, the prediction in respect to an actual phenomenon that may occur in the future is conducted as a game in respect to the user employing the terminal device, so the user can perform predictions in respect to complex, difficult-to-predict phenomena in the real world which cannot necessarily be controlled by human beings, instead of artificially created phenomena in virtual space such as game space.

If the user's prediction satisfies a predetermined condition with the actually occurring result, instead of the value data being directly provided, the value data is provided through an intermediate object, namely, points, which can be increased or decreased. Accordingly, difficulty in acquisition of the value data can be conferred. The user's feeling of anticipation in respect to acquisition of the value data can therefore be increased, since the user's perception of value in regard to the value data that is finally provided can be heightened.

Furthermore, by the user continuing to play the game, points can be increased every time the user's prediction and the actually occurring result satisfy a predetermined condition, so the desired value data can be acquired by continuous increase in the points.

Further, the server device may comprise user information management means that manages the points and value data in association with the user employing the terminal device.

The points and value data provided in accordance with the state of progress of the game are managed in association with the user who employs the terminal device. Accordingly, the user can check the points and value data accumulated in accordance with the state of progress of the game by accessing the network game server device. In addition, although, since the points and value data are provided in the form of digital data, it would easily be possible to perform copying and alteration etc thereof, since the points and value data are managed by the network game server device, dishonest user actions such as copying and alteration etc of the points and value data can be prevented.

The server device may further comprise value data provision request receiving means that receives a request for provision of value data requesting provision of value data from the terminal device. The value data provision means, if the points managed by the user information management means satisfy a prescribed condition, provides the user with the value data in accordance with the request for provision of value data and effects a reduction in points determined in accordance with the value data that has been provided.

Accordingly, if, with progress of the game, a value data provision request from the user in accordance with points acquired by the user is received, and these user points that are managed at the network game server device satisfy a prescribed condition, value data in accordance with the value data provision request is provided to the user.

The server device may further comprise point exchange request receiving means that receives from the terminal device a point exchange request requesting exchange of value data managed by the user information management means and points determined in accordance with this value data, in which the point awarding means deletes the value data managed by the user information management means in accordance with the point exchange request and awards to the user points corresponding to this value data.

Specifically, when a point exchange request requesting conversion into points determined in accordance with value data acquired by the user is received from the terminal device employed by the user, prescribed points are awarded to the user in accordance with this point exchange request. If the user decides that acquired value data is no longer required, the user can therefore convert this value data into points. Also, the user can convert duplicated value data into points if for example value data acquired by the user is duplicated etc.

The value data may include first value data and second value data smaller in number than the first value data.

Specifically, since, as the value data, value data are included that are different in numerical amount, if the user has the objective of collecting value data, the user can appreciate the difficulty of acquiring value data which are small in number, i.e., rare. Also, if the points for exchange with value data that are small in number are set higher than for the case of ordinary value data, the user is motivated to continue the game, since more points must be acquired.

The value data provision means may be made to provide to the user value data randomly selected from the value data including the first and second value data, if the points managed by the user information management means satisfy a prescribed condition and notification of agreement to exchange the prescribed points with value data is received from the terminal device.

Accordingly, if the points acquired by user satisfy a prescribed condition and notification of agreement to exchange the prescribed points with value data is received from the terminal device, value data is randomly selected from the value data including the first and second value data which are different in numerical amount and the selected value data is provided to the user employing the terminal device.

The user is therefore enabled to exchange prescribed points and value data in accordance with a random selection, if the acquired points satisfy a prescribed condition. Since the value data includes first and second value data different in numerical amount, if things go well for the user, the user can acquire value data which is small in numerical amount, i.e., rare.

The server device may further comprise notification means that notifies the terminal device that exchange of these points and value data is possible if the points managed by the user information management device satisfy a prescribed condition.

Since the terminal device is notified that exchange of points and value data as possible if the points managed in association with the user satisfy a prescribed condition, for example a user who has acquired a large number of points can be prompted to acquire value data in accordance with the acquired points.

The server may further comprise value data inspection allowing means that allows these value data to be inspected after performing prescribed data processing so as to make these value data incapable of copying at the terminal device, on receipt from the terminal device of a request for inspection of value data provided by the value data provision means.

Since, on receipt of a request to inspect value data provided to this user from the user's terminal device, this value data is allowed to inspect after prescribed data processing so as to make the value data whose inspection has been requested incapable of being copied at the user terminal device, dishonest actions by the user such as copying of the value data at the user end can be prevented and the user can inspect the desired value data.

The prediction data may include supported subject prediction data that predicts winning/losing of a supported subject supported by the user in a sports match that is actually performed and non-supported subject prediction data that predicts winning/losing of a non-supported subject which is not supported by the user.

Since the prediction data received from the user who employs the terminal device includes supported subject prediction data and non-supported subject prediction data predicting winning/losing of a supported subject and a non-supported subject in sports matches that are currently being conducted, even if for example the prediction of winning/losing of the supported subject is belied by the actual results in respect to the prediction data, the user can be awarded points by successful prediction of winning/losing of the non-supported subject. Also, since it may be assumed that normally the winning/losing results of the supported subject and non-supported subject will be a matter of concern to the user, the game content can be linked with a matter of concern to the user.

An inventive method for controlling progress of a network game in which progress of a network game is controlled using a server device that performs transmission and reception of data with a terminal device employed by the user, comprises: a prediction data registration step in which prediction data corresponding to the content of prediction by the user regarding an actual phenomenon that may occur in the future is received by the server device from a terminal device that performs transmission and reception of data with the server device through a network and the received prediction data is registered in association with this user; a result data acquisition step in which the server device acquires the phenomenon that actually occurred in respect to the prediction data as result data; a point awarding step in which the server device awards prescribed points to the user registered in association with this prediction data if the result data and the prediction data satisfy a predetermined condition; and a value data providing step in which the server device provides value data having a prescribed value in accordance with the points to the user.

Prediction data corresponding to the user's prediction content in respect to an actual phenomenon that may occur in the future is received by the server device from the terminal device that performs transmission and reception of data with the server device through the network and the received prediction data is registered in association with this user. The phenomenon that actually occurs in respect to the registered prediction data is then acquired as result data and, if the acquired result data and the registered prediction data satisfy a predetermined condition, prescribed points are awarded to the user registered in association with this prediction data and, in addition, value data having a prescribed value in accordance with the awarded points is provided to the user.

In this way, the prediction in respect to an actual phenomenon that may occur in the future is conducted as a game in respect to the user employing the terminal device, so the user can perform predictions in respect to complex, difficult-to-predict phenomena in the real world which cannot necessarily be controlled by human beings, instead of artificially created phenomena in virtual space such as game space.

Also, since, if the user's prediction satisfies a predetermined condition with the actually occurring result, instead of the value data being directly provided, the value data is provided through an intermediate object, namely, points, which can be increased or decreased, difficulty in acquisition of the value data can be conferred. The user's feeling of anticipation in respect to acquisition of the value data can therefore be increased, since the user's perception of value in regard to the value data that is finally provided can be heightened.

Furthermore, by the user continuing to play the game, points can be increased every time the user's prediction and the actually occurring result satisfy a predetermined condition, so the desired value data can be acquired by continuous increase in the points.

Moreover, an inventive network game progress control execution program product for controlling progress of a network game using a server device that performs transmission and reception of data with a terminal device employed by a user, comprises a program which makes the server device perform: receiving prediction data corresponding to the content of prediction by a user regarding an actual phenomenon that may occur in the future by the network server device from a terminal device through a network, registering the received prediction data in association with this user; acquiring the phenomenon that actually occurred in respect to the prediction data as result data; awarding a prescribed point amount to the user registered in association with the prediction data if the result data and the prediction data satisfy a predetermined condition; and providing value data having a prescribed value in accordance with the point amount to the user; and a signal bearing media bearing the program.

Prediction data corresponding to the user's prediction content in respect to an actual phenomenon that may occur in the future is received by the server device from the terminal device that performs transmission and reception of data with the server device through the network and the received prediction data is registered in association with this user. The phenomenon that actually occurs in respect to the registered prediction data is then acquired as result data and, if the acquired result data and the registered prediction data satisfy a predetermined condition, prescribed points are awarded to the user registered in association with this prediction data and, in addition, value data having a prescribed value in accordance with the awarded points is provided to the user.

In this way, the prediction in respect to an actual phenomenon that may occur in the future is conducted as a game in respect to the user employing the terminal device, so the user can perform predictions in respect to complex, difficult-to-predict phenomena in the real world which cannot necessarily be controlled by human beings, instead of artificially created phenomena in virtual space such as game space.

Also, since, if the user's prediction satisfies a predetermined condition with the actually occurring result, instead of the value data being directly provided, the value data is provided through an intermediate object, namely, points, which can be increased or decreased, difficulty in acquisition of the value data can be conferred. The user's feeling of anticipation in respect to acquisition of the value data can therefore be increased, since the user's perception of value in regard to the value data that is finally provided can be heightened.

Furthermore, by the user continuing to play the game, points can be increased every time the user's prediction and the actually occurring result satisfy a predetermined condition, so the desired value data can be acquired by continuous increase in the points.

This application is based on patent application No. 2001–190371 filed in Japan, the contents of which are hereby incorporated by reference.

As this invention may be embodied in several forms without departing from the spirit of essential characteristics thereof, the present embodiment is therefore illustrative and not restrictive, since the scope of the invention is defined by

What is claimed is:

1. A network game server device for performing transmission and reception of data to and from a terminal device employed by a user through a network, comprising:
prediction data registration means for receiving, from the terminal device, prediction data corresponding to a prediction by the user of a result of an actual phenomenon that may occur in the future, and registering the received prediction data in association with the user;
result data acquisition means for acquiring result data of the phenomenon that actually occurred;
point awarding means for awarding a prescribed point amount to a point total of the user registered in association with the prediction data if the result data and the prediction data satisfy a predetermined condition;
user information management means for managing points and value data in association with the user employing the terminal device to determine the point total and value data managed by the user;
value data provision request receiving means for receiving a value data provision request requesting provision of value data from the terminal device;
value data provision means for providing to the user value data, in response to the value data provision request received, the value data having a prescribed value in accordance with a given point amount, and subtracting the given point amount from the point total of the user if the point total of the user is sufficient to provide the given point amount, wherein the prescribed value of the value data is randomly selected; and
value data inspection allowing means for allowing the value data to be inspected after performing a prescribed data processing so as to make the value data incapable of copying at the terminal device, on receipt from the terminal device of a request for inspection of value data provided by the value data provision means.

2. The network game server device according to claim 1, further comprising:
point exchange request receiving means for receiving from the terminal device a point exchange request requesting exchange of a portion of the value data managed by the user information management means and a point amount determined in accordance with the portion of the value data,
wherein the point awarding means deletes the portion of the value data managed by the user information management means in accordance with the point exchange request, and awards to the user the point amount corresponding to the portion of the value data.

3. The network game server device according to claim 2, wherein the value data deleted by the point awarding means is selected from a first value data and second value data which is less in value than the first value data.

4. The network game server device according to claim 1, wherein the value data provision means provides to the user value data randomly selected from a first and second value data.

5. The network game server device according to claim 4, further comprising notification means for notifying the terminal device that exchange of the point and value data is possible if the point total managed by the user information management device satisfies a prescribed condition.

6. The network game server device according to claim 5, wherein the prediction data includes supported subject prediction data that predicts winning/losing of a supported subject supported by the user in a sports match that is actually performed and non-supported subject prediction data that predicts winning/losing of a non-supported subject which is not supported by the user.

7. The network game server device according to claim 1, further comprising notification means for notifying the terminal device that exchange of the point and value data is possible if the point total managed by the user information management device satisfies a prescribed condition.

8. The network game server device according to claim 1, wherein the prediction data includes supported subject prediction data that predicts winning/losing of a supported subject supported by the user in a sports match that is actually performed and non-supported subject prediction data that predicts winning/losing of a non-supported subject which is not supported by the user.

9. A method of executing a network game, comprising the steps of:
receiving, from a terminal device, prediction data corresponding to a prediction by a user of a result of an actual phenomenon that may occur in the future;
registering the received prediction data in association with the user;
acquiring result data of the phenomenon that actually occurred;
awarding a prescribed point amount to a point total of the user registered in association with the prediction data if the result data and the prediction data satisfy a predetermined condition;
managing points and value data in association with the user employing the terminal device to determine the point total and value data managed by the user;
receiving a value data provision request requesting provision of value data from the terminal device;
providing value data to the user, in response to the value data provision request received, the value data having a prescribed value in accordance with a given point amount, and subtracting the given point amount from the point total of the user if the point total of the user is sufficient to provide the given point amount, wherein the prescribed value of the value data is randomly selected; and
allowing the value data to be inspected after performing a prescribed data processing so as to make the value data incapable of copying at the terminal device, on receipt from the terminal device of a request for inspection of value data.

10. The method according to claim 9, further comprising:
receiving from the terminal device a point exchange request requesting exchange of a portion of the value data associated with the user for a point amount determined in accordance with the portion of the value data,
deleting the portion of the value data in accordance with the point exchange request; and
awarding to the user the point amount corresponding to the portion of the value data.

11. The method according to claim 10, wherein the value data deleted is selected from a first value data and second value data which is less in value than the first value data.

12. The method according to claim 9, wherein the providing of value data provides to the user value data randomly selected from a first and second value data.

13. The method according to claim 12, further comprising notifying the terminal device that exchange of the point and value data is possible if the point total of the user satisfies a prescribed condition.

14. The method according to claim 9, wherein the prediction data includes supported subject prediction data that predicts winning/losing of a supported subject supported by the user in a sports match that is actually performed and non-supported subject prediction data that predicts winning/losing of a non-supported subject which is not supported by the user.

15. A medium storing an executable program for a server of a network game to enable to server to execute the steps comprising:

receiving from a terminal device, prediction data corresponding to a prediction by a user of a result of an actual phenomenon that may occur in the future;

registering the received prediction data in association with the user;

acquiring result data of the phenomenon that actually occurred;

awarding a prescribed point amount to a point total of the user registered in association with the prediction data if the result data and the prediction data satisfy a predetermined condition;

managing points and value data in association with the user employing the terminal device to determine the point total and value data managed by the user;

receiving a value data provision request requesting provision of value data from the terminal device;

providing value data to the user, in response to the value data provision request received, the value data having a prescribed value in accordance with a given point amount, and subtracting the given point amount from the point total of the user if the point total of the user is sufficient to provide the given point amount, wherein the prescribed value of the value data is randomly selected; and allowing the value data to be inspected after performing a prescribed data processing so as to make the value data incapable of copying at the terminal device, on receipt from the terminal device of a request for inspection of value data.

16. The medium according to claim 15, further including execution of the steps comprising:

receiving from the terminal device a point exchange request requesting exchange of a portion of the value data associated with the user for a point amount determined in accordance with the portion of the value data, deleting the portion of the value data in accordance with the point exchange request; and awarding to the user the point amount corresponding to the portion of the value data.

17. The medium according to claim 16, wherein the value data deleted is selected from a first value data and second value data smaller in number than the first value data.

18. The medium according to claim 15, wherein the providing of value data provides to the user value data randomly selected from a first and second value data.

19. The medium according to claim 18, further including execution of the step comprising notifying the terminal device that exchange of the point and value data is possible if the point total of the user satisfies a prescribed condition.

20. The medium according to claim 15, wherein the prediction data includes supported subject prediction data that predicts winning/losing of a supported subject supported by the user in a sports match that is actually performed and non-supported subject prediction data tat predicts winning/losing of a non-supported subject which is not supported by the user.

* * * * *